US009477625B2

(12) United States Patent
Huang et al.

(10) Patent No.: US 9,477,625 B2
(45) Date of Patent: *Oct. 25, 2016

(54) REVERSIBLE CONNECTOR FOR ACCESSORY DEVICES

(71) Applicant: Microsoft Technology Licensing, LLC, Redmond, WA (US)

(72) Inventors: Heng Huang, Sammamish, WA (US); Duane Martin Evans, Snohomish, WA (US); Yi He, Issaquah, WA (US); Gene Robert Obie, Clinton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,739

(22) Filed: Mar. 31, 2016

(65) Prior Publication Data

US 2016/0217092 A1 Jul. 28, 2016

Related U.S. Application Data

(63) Continuation of application No. 14/304,174, filed on Jun. 13, 2014, now Pat. No. 9,367,490.

(51) Int. Cl.
*G06F 3/00* (2006.01)
*G06F 13/00* (2006.01)
(Continued)

(52) U.S. Cl.
CPC ......... *G06F 13/387* (2013.01); *G06F 13/4022* (2013.01); *G06F 13/4081* (2013.01); *G06F 13/4282* (2013.01); *G06F 21/33* (2013.01)

(58) Field of Classification Search
None
See application file for complete search history.

(56) References Cited

U.S. PATENT DOCUMENTS 4,868,653 A 9/1989 Golin et al.
5,060,170 A 10/1991 Bourgeois
(Continued)

FOREIGN PATENT DOCUMENTS

CN 101753404 6/2010
EP 0704655 4/1996
(Continued)

OTHER PUBLICATIONS

"Get history and other info about your code", <<http://msdn.microsoft.com/en-us/library/dn269218.aspx>>, retrieved May 23, 2014,, 10 pages.
(Continued)

*Primary Examiner* — David E Martinez
(74) *Attorney, Agent, or Firm* — Qudus Olaniran; Judy Yee; Micky Minhas

(57) ABSTRACT

Reversible connectors for accessory devices are described. In one or more implementations, a connector cable for an accessory of a host computing device is configured such that a head of the connector cable may be plugged into a corresponding port of the host in either orientation (straight or reverse). The host computing device is configured to sample signals associated with allocated pins of the connector to detect connection of the connector to an accessory port and to ascertain an orientation of the connector. A combination of high and low values of signals conveyed via these allocated pins upon insertion of the connector may be used by a controller of the host to distinguish between different types of devices and to resolve the orientation of the connector cable. A switching mechanism of the host computing device may then be configured to automatically route signals accordingly.

20 Claims, 7 Drawing Sheets

(51) Int. Cl.
  *G06F 13/12* (2006.01)
  *G06F 13/38* (2006.01)
  *G06F 13/40* (2006.01)
  *G06F 13/42* (2006.01)
  *G06F 21/33* (2013.01)

(56) References Cited

U.S. PATENT DOCUMENTS

| | | |
|---|---|---|
| 5,149,919 A | 9/1992 | Greanias et al. |
| 5,241,682 A | 8/1993 | Bryant et al. |
| 5,353,133 A | 10/1994 | Bernkopf |
| 5,450,586 A | 9/1995 | Kuzara et al. |
| 5,475,425 A | 12/1995 | Przyborski et al. |
| 5,544,258 A | 8/1996 | Levien |
| 5,687,011 A | 11/1997 | Mowry |
| 5,717,957 A | 2/1998 | Lin |
| 5,778,404 A | 7/1998 | Capps et al. |
| 5,831,594 A | 11/1998 | Tognazzini et al. |
| 5,867,709 A | 2/1999 | Klencke |
| 5,903,566 A | 5/1999 | Flammer, III |
| 5,964,879 A | 10/1999 | Dunstan |
| 6,028,960 A | 2/2000 | Graf et al. |
| 6,151,643 A | 11/2000 | Cheng et al. |
| 6,167,377 A | 12/2000 | Gillick et al. |
| 6,185,528 B1 | 2/2001 | Fissore |
| 6,232,972 B1 | 5/2001 | Arcuri et al. |
| 6,263,308 B1 | 7/2001 | Heckerman et al. |
| 6,282,709 B1 | 8/2001 | Reha et al. |
| 6,283,858 B1 | 9/2001 | Hayes et al. |
| 6,297,825 B1 | 10/2001 | Madden et al. |
| 6,339,437 B1 | 1/2002 | Nielsen |
| 6,349,406 B1 | 2/2002 | Levine et al. |
| 6,389,181 B2 | 5/2002 | Shaffer et al. |
| 6,452,597 B1 | 9/2002 | Goldberg et al. |
| 6,452,915 B1 | 9/2002 | Jorgensen |
| 6,603,491 B2 | 8/2003 | Lemelson et al. |
| 6,757,027 B1 | 6/2004 | Edwards et al. |
| 6,847,386 B2 | 1/2005 | Paleiov |
| 6,854,073 B2 | 2/2005 | Bates et al. |
| 6,879,709 B2 | 4/2005 | Tian et al. |
| 6,934,370 B1 | 8/2005 | Leban et al. |
| 6,970,947 B2 | 11/2005 | Ebling et al. |
| 7,082,211 B2 | 7/2006 | Simon et al. |
| 7,146,296 B1 | 12/2006 | Carlbom et al. |
| 7,171,432 B2 | 1/2007 | Wildhahen |
| 7,194,114 B2 | 3/2007 | Schneiderman |
| 7,200,561 B2 | 4/2007 | Moriya et al. |
| 7,251,812 B1 | 7/2007 | Jhanwar et al. |
| 7,254,257 B2 | 8/2007 | Kim et al. |
| 7,337,112 B2 | 2/2008 | Moriya et al. |
| 7,370,043 B1 | 5/2008 | Shelton et al. |
| 7,380,003 B1 | 5/2008 | Guo et al. |
| 7,387,539 B2 | 6/2008 | Trenne |
| 7,400,439 B2 | 7/2008 | Holman |
| 7,443,791 B2 | 10/2008 | Barrett et al. |
| 7,443,807 B2 | 10/2008 | Cutler |
| 7,458,825 B2 | 12/2008 | Atsmon et al. |
| 7,466,986 B2 | 12/2008 | Halcrow et al. |
| 7,496,910 B2 | 2/2009 | Voskuil |
| 7,525,928 B2 | 4/2009 | Cutler |
| 7,551,754 B2 | 6/2009 | Steinberg et al. |
| 7,577,295 B2 | 8/2009 | Constantin et al. |
| 7,577,297 B2 | 8/2009 | Mori et al. |
| 7,580,952 B2 | 8/2009 | Logan et al. |
| 7,584,285 B2 | 9/2009 | Hudson et al. |
| 7,606,375 B2 | 10/2009 | Bailey et al. |
| 7,614,046 B2 | 11/2009 | Daniels et al. |
| 7,639,877 B2 | 12/2009 | Shiota et al. |
| 7,680,327 B2 | 3/2010 | Weiss |
| 7,690,042 B2 | 3/2010 | Rantalahti |
| 7,697,557 B2 | 4/2010 | Segel |
| 7,703,036 B2 | 4/2010 | Satterfield |
| 7,715,598 B2 | 5/2010 | Li et al. |
| 7,716,643 B2 | 5/2010 | Goldin |
| 7,729,902 B1 | 6/2010 | Gupta |
| 7,738,870 B2 | 6/2010 | Howard |
| 7,751,599 B2 | 7/2010 | Chen et al. |
| 7,756,538 B2 | 7/2010 | Bonta et al. |
| 7,765,194 B1 | 7/2010 | Sharma et al. |
| 7,766,498 B2 | 8/2010 | Sampsell |
| 7,779,367 B2 | 8/2010 | Oshiro et al. |
| 7,783,629 B2 | 8/2010 | Li et al. |
| 7,783,777 B1 | 8/2010 | Pabla et al. |
| 7,835,910 B1 | 11/2010 | Hakkani-Tur et al. |
| 7,864,967 B2 | 1/2011 | Takeuchi et al. |
| 7,865,952 B1 | 1/2011 | Hopwood et al. |
| 7,881,479 B2 | 2/2011 | Asada |
| 7,900,011 B2 | 3/2011 | Amundsen et al. |
| 7,959,308 B2 | 6/2011 | Freeman et al. |
| 7,970,350 B2 | 6/2011 | Sheynman et al. |
| 7,970,901 B2 | 6/2011 | Lipscomb et al. |
| 7,978,925 B1 | 7/2011 | Souchard |
| 8,015,006 B2 | 9/2011 | Kennewick et al. |
| 8,026,830 B2 | 9/2011 | Womble et al. |
| 8,074,213 B1 | 12/2011 | Holtz |
| 8,078,623 B2 | 12/2011 | Chou et al. |
| 8,091,074 B2 | 1/2012 | Lyon-Smith |
| 8,107,243 B2 | 1/2012 | Guccione et al. |
| 8,149,748 B2 | 4/2012 | Bata et al. |
| 8,150,098 B2 | 4/2012 | Gallagher et al. |
| 8,155,400 B2 | 4/2012 | Bronstein et al. |
| 8,165,352 B1 | 4/2012 | Mohanty |
| 8,170,298 B2 | 5/2012 | Li et al. |
| 8,189,807 B2 | 5/2012 | Cutler |
| 8,194,177 B2 | 6/2012 | Jung et al. |
| 8,212,894 B2 | 7/2012 | Nozaki et al. |
| 8,213,333 B2 | 7/2012 | Greel et al. |
| 8,213,690 B2 | 7/2012 | Okada et al. |
| 8,224,036 B2 | 7/2012 | Maruyama et al. |
| 8,229,729 B2 | 7/2012 | Sarikaya et al. |
| 8,232,962 B2 | 7/2012 | Buck |
| 8,239,446 B2 | 8/2012 | Navar et al. |
| 8,245,043 B2 | 8/2012 | Cutler |
| 8,275,615 B2 | 9/2012 | Kozat |
| 8,296,107 B2 | 10/2012 | Turner et al. |
| 8,296,673 B2 | 10/2012 | Lipstein et al. |
| 8,302,006 B2 | 10/2012 | Stanek et al. |
| 8,306,280 B2 | 11/2012 | Nozaki et al. |
| 8,316,237 B1 | 11/2012 | Felsher et al. |
| 8,321,220 B1 | 11/2012 | Chotimongkol et al. |
| 8,326,634 B2 | 12/2012 | Di Cristo et al. |
| 8,331,632 B1 | 12/2012 | Mohanty et al. |
| 8,345,934 B2 | 1/2013 | Obrador et al. |
| 8,346,563 B1 | 1/2013 | Hjelm et al. |
| 8,358,811 B2 | 1/2013 | Adams et al. |
| 8,364,717 B2 | 1/2013 | Delling et al. |
| 8,368,540 B2 | 2/2013 | Perkins et al. |
| 8,373,829 B2 | 2/2013 | Hara et al. |
| 8,374,122 B2 | 2/2013 | Meier et al. |
| 8,375,456 B2 | 2/2013 | Li et al. |
| 8,384,694 B2 | 2/2013 | Powell et al. |
| 8,384,791 B2 | 2/2013 | Porter et al. |
| 8,392,594 B2 | 3/2013 | Georgis et al. |
| 8,397,163 B1 | 3/2013 | Sran |
| 8,400,332 B2 | 3/2013 | Szwabowski et al. |
| 8,406,206 B2 | 3/2013 | Chiang |
| 8,407,472 B2 | 3/2013 | Hao et al. |
| 8,410,903 B2 | 4/2013 | Hirai |
| 8,412,521 B2 | 4/2013 | Mathias et al. |
| 8,413,198 B2 | 4/2013 | Connor et al. |
| 8,448,847 B2 | 5/2013 | Lee |
| 8,468,548 B2 | 6/2013 | Kulkarni et al. |
| 8,484,314 B2 | 7/2013 | Luna et al. |
| 8,493,992 B2 | 7/2013 | Sella et al. |
| 8,495,372 B2 | 7/2013 | Bailey et al. |
| 8,504,823 B2 | 8/2013 | Carpenter et al. |
| 8,516,471 B2 | 8/2013 | Bhakta et al. |
| 8,522,209 B2 | 8/2013 | Wintergerst et al. |
| 8,526,683 B2 | 9/2013 | Maruyama et al. |
| 8,527,602 B1 | 9/2013 | Rasmussen et al. |
| 8,532,347 B2 | 9/2013 | Bourdev |
| 8,535,075 B1 | 9/2013 | Golko et al. |
| 8,538,091 B2 | 9/2013 | Kaneda et al. |
| 8,539,477 B2 | 9/2013 | Balascio et al. |

(56) References Cited

U.S. PATENT DOCUMENTS

| | | | |
|---|---|---|---|
| 8,549,150 B1 | 10/2013 | Roseman et al. | |
| 8,555,364 B2 | 10/2013 | Filippi et al. | |
| 8,559,722 B2 | 10/2013 | Tsuji | |
| 8,571,866 B2 | 10/2013 | Melamed et al. | |
| 8,611,678 B2 | 12/2013 | Hanson et al. | |
| 8,614,734 B2 | 12/2013 | Cutler | |
| 8,619,062 B2 | 12/2013 | Powell et al. | |
| 8,620,351 B2 | 12/2013 | Karaoguz | |
| 8,620,649 B2 | 12/2013 | Gao | |
| 8,626,932 B2 | 1/2014 | Lydon et al. | |
| 8,631,350 B2 | 1/2014 | Lepage et al. | |
| 8,670,850 B2 | 3/2014 | Soulodre | |
| 8,686,600 B2 | 4/2014 | Terlizzi et al. | |
| 8,701,102 B2 | 4/2014 | Appiah et al. | |
| 8,705,806 B2 | 4/2014 | Nakano | |
| 8,719,603 B2 | 5/2014 | Belesiu | |
| 8,756,507 B2 | 6/2014 | Fong et al. | |
| 8,776,166 B1 | 7/2014 | Erickson et al. | |
| 8,924,315 B2 | 12/2014 | Archambeau | |
| 8,935,673 B1 | 1/2015 | Ashkenazi et al. | |
| 9,017,092 B1* | 4/2015 | McCracken | H01R 13/62 439/374 |
| 9,058,311 B1 | 6/2015 | Bertz et al. | |
| 9,088,891 B2 | 7/2015 | Belton et al. | |
| 9,239,773 B1 | 1/2016 | Teplitsky et al. | |
| 9,324,323 B1 | 4/2016 | Bikel et al. | |
| 9,367,490 B2 | 6/2016 | Huang et al. | |
| 9,384,334 B2 | 7/2016 | Burba et al. | |
| 9,384,335 B2 | 7/2016 | Hunt et al. | |
| 9,430,667 B2 | 8/2016 | Burba et al. | |
| 2001/0000356 A1 | 4/2001 | Woods | |
| 2002/0041590 A1 | 4/2002 | Donovan | |
| 2002/0083041 A1 | 6/2002 | Achlioptas | |
| 2002/0101918 A1 | 8/2002 | Rodman et al. | |
| 2002/0116171 A1 | 8/2002 | Russell | |
| 2002/0143855 A1 | 10/2002 | Traversat et al. | |
| 2002/0149924 A1 | 10/2002 | Falicoff et al. | |
| 2003/0031177 A1 | 2/2003 | Robidas et al. | |
| 2003/0064142 A1 | 4/2003 | Wagner et al. | |
| 2003/0068100 A1 | 4/2003 | Covell et al. | |
| 2003/0125948 A1 | 7/2003 | Lyudovyk | |
| 2003/0182414 A1 | 9/2003 | O'Neill | |
| 2003/0212543 A1 | 11/2003 | Epstein | |
| 2003/0212544 A1 | 11/2003 | Acero | |
| 2004/0032831 A1 | 2/2004 | Matthews | |
| 2004/0040021 A1 | 2/2004 | Bharati et al. | |
| 2004/0088726 A1 | 5/2004 | Ma et al. | |
| 2004/0168165 A1 | 8/2004 | Kokkinen | |
| 2004/0210752 A1 | 10/2004 | Rao | |
| 2004/0240711 A1 | 12/2004 | Hamza et al. | |
| 2005/0039169 A1 | 2/2005 | Hsu et al. | |
| 2005/0052427 A1 | 3/2005 | Wu et al. | |
| 2005/0058297 A1 | 3/2005 | Jot et al. | |
| 2005/0065789 A1 | 3/2005 | Yacoub | |
| 2005/0091057 A1 | 4/2005 | Mark et al. | |
| 2005/0114625 A1 | 5/2005 | Snyder | |
| 2005/0144616 A1 | 6/2005 | Hammond et al. | |
| 2005/0163372 A1 | 7/2005 | Kida et al. | |
| 2005/0165598 A1 | 7/2005 | Cote et al. | |
| 2005/0165839 A1 | 7/2005 | Madan et al. | |
| 2005/0177515 A1 | 8/2005 | Kalavade et al. | |
| 2005/0177624 A1 | 8/2005 | Oswald et al. | |
| 2005/0198407 A1* | 9/2005 | Lee | G06F 1/266 710/15 |
| 2005/0245243 A1 | 11/2005 | Zuniga | |
| 2006/0009996 A1 | 1/2006 | Lipscomb et al. | |
| 2006/0034542 A1 | 2/2006 | Aoyama | |
| 2006/0036965 A1 | 2/2006 | Harris et al. | |
| 2006/0046709 A1 | 3/2006 | Krumm et al. | |
| 2006/0058009 A1 | 3/2006 | Vogedes et al. | |
| 2006/0088209 A1 | 4/2006 | Yu et al. | |
| 2006/0156222 A1 | 7/2006 | Chi et al. | |
| 2006/0174017 A1 | 8/2006 | Robertson | |
| 2006/0200477 A1 | 9/2006 | Barrenechea | |
| 2006/0212867 A1 | 9/2006 | Fields et al. | |
| 2006/0218302 A1 | 9/2006 | Chia et al. | |
| 2006/0244845 A1 | 11/2006 | Craig et al. | |
| 2006/0253491 A1 | 11/2006 | Gokturk | |
| 2006/0277478 A1 | 12/2006 | Seraji et al. | |
| 2006/0280341 A1 | 12/2006 | Koshizen | |
| 2006/0290705 A1 | 12/2006 | White | |
| 2007/0002478 A1 | 1/2007 | Mowry | |
| 2007/0038436 A1 | 2/2007 | Cristo et al. | |
| 2007/0053607 A1 | 3/2007 | Mitsunaga | |
| 2007/0055752 A1 | 3/2007 | Wiegand et al. | |
| 2007/0055936 A1 | 3/2007 | Dhanjal et al. | |
| 2007/0058878 A1 | 3/2007 | Gomilla et al. | |
| 2007/0074168 A1 | 3/2007 | Bates et al. | |
| 2007/0147318 A1 | 6/2007 | Ross et al. | |
| 2007/0150428 A1 | 6/2007 | Webb | |
| 2007/0156392 A1 | 7/2007 | Balchandran et al. | |
| 2007/0157313 A1 | 7/2007 | Denton | |
| 2007/0172099 A1 | 7/2007 | Park | |
| 2007/0188477 A1 | 8/2007 | Rehm | |
| 2007/0198950 A1 | 8/2007 | Dodge et al. | |
| 2007/0203863 A1 | 8/2007 | Gupta | |
| 2007/0226649 A1 | 9/2007 | Agmon | |
| 2007/0233879 A1 | 10/2007 | Woods | |
| 2007/0294061 A1 | 12/2007 | Carlbom et al. | |
| 2008/0004877 A1 | 1/2008 | Tian | |
| 2008/0005114 A1 | 1/2008 | Li | |
| 2008/0014563 A1 | 1/2008 | Visani | |
| 2008/0037438 A1 | 2/2008 | Twiss et al. | |
| 2008/0037442 A1 | 2/2008 | Bill | |
| 2008/0046425 A1 | 2/2008 | Perski | |
| 2008/0055278 A1 | 3/2008 | Locker et al. | |
| 2008/0066181 A1 | 3/2008 | Haveson et al. | |
| 2008/0069364 A1 | 3/2008 | Itou et al. | |
| 2008/0089299 A1 | 4/2008 | Lindsley et al. | |
| 2008/0089561 A1 | 4/2008 | Zhang | |
| 2008/0137875 A1 | 6/2008 | Zong et al. | |
| 2008/0140981 A1 | 6/2008 | Kim | |
| 2008/0143674 A1 | 6/2008 | Molander et al. | |
| 2008/0159232 A1 | 7/2008 | Thalanany et al. | |
| 2008/0165701 A1 | 7/2008 | Ananthanarayanan et al. | |
| 2008/0175190 A1 | 7/2008 | Lee et al. | |
| 2008/0183751 A1 | 7/2008 | Cazier et al. | |
| 2008/0192820 A1 | 8/2008 | Brooks et al. | |
| 2008/0195388 A1 | 8/2008 | Bower et al. | |
| 2008/0204598 A1 | 8/2008 | Maurer et al. | |
| 2008/0209354 A1 | 8/2008 | Stanek et al. | |
| 2008/0212894 A1 | 9/2008 | Demirli et al. | |
| 2008/0235017 A1 | 9/2008 | Satomura | |
| 2008/0253564 A1 | 10/2008 | Kahn et al. | |
| 2008/0263130 A1 | 10/2008 | Michalowitz et al. | |
| 2008/0273708 A1 | 11/2008 | Sandgren et al. | |
| 2008/0313264 A1 | 12/2008 | Pestoni | |
| 2009/0028380 A1 | 1/2009 | Hillebrand et al. | |
| 2009/0030697 A1 | 1/2009 | Cerra et al. | |
| 2009/0046864 A1 | 2/2009 | Mahabub et al. | |
| 2009/0055389 A1 | 2/2009 | Schilit et al. | |
| 2009/0055461 A1 | 2/2009 | Georgis et al. | |
| 2009/0083148 A1 | 3/2009 | Hwang et al. | |
| 2009/0087099 A1 | 4/2009 | Nakamura | |
| 2009/0089801 A1 | 4/2009 | Jones et al. | |
| 2009/0100384 A1 | 4/2009 | Louch | |
| 2009/0100459 A1 | 4/2009 | Riedl et al. | |
| 2009/0100489 A1 | 4/2009 | Strothmann | |
| 2009/0116749 A1 | 5/2009 | Cristinacce et al. | |
| 2009/0180671 A1 | 7/2009 | Lee | |
| 2009/0185723 A1 | 7/2009 | Kurtz | |
| 2009/0187593 A1 | 7/2009 | Chen et al. | |
| 2009/0210328 A1 | 8/2009 | Fomenko et al. | |
| 2009/0259667 A1 | 10/2009 | Wang et al. | |
| 2009/0271735 A1 | 10/2009 | Anderson et al. | |
| 2009/0292687 A1 | 11/2009 | Fan | |
| 2009/0300596 A1 | 12/2009 | Tyhurst et al. | |
| 2009/0313330 A1 | 12/2009 | Sakamoto | |
| 2009/0313546 A1 | 12/2009 | Katpelly et al. | |
| 2010/0004930 A1 | 1/2010 | Strope | |
| 2010/0011123 A1 | 1/2010 | Dantzig et al. | |
| 2010/0015956 A1 | 1/2010 | Qu et al. | |
| 2010/0023625 A1 | 1/2010 | Lee et al. | |
| 2010/0027663 A1 | 2/2010 | Dai et al. | |

(56) References Cited

U.S. PATENT DOCUMENTS

| | | |
|---|---|---|
| 2010/0054544 A1 | 3/2010 | Arguelles |
| 2010/0076941 A1 | 3/2010 | Dotsenko et al. |
| 2010/0082478 A1 | 4/2010 | Van Der Veen et al. |
| 2010/0103117 A1 | 4/2010 | Townsend et al. |
| 2010/0111059 A1 | 5/2010 | Bappu et al. |
| 2010/0114890 A1 | 5/2010 | Hagar |
| 2010/0121954 A1 | 5/2010 | Yang et al. |
| 2010/0128863 A1 | 5/2010 | Krum et al. |
| 2010/0135038 A1 | 6/2010 | Handschy et al. |
| 2010/0189313 A1 | 7/2010 | Prokoski |
| 2010/0191837 A1 | 7/2010 | Linden et al. |
| 2010/0205177 A1 | 8/2010 | Sato |
| 2010/0211695 A1 | 8/2010 | Steinmetz et al. |
| 2010/0211908 A1 | 8/2010 | Luk et al. |
| 2010/0229222 A1 | 9/2010 | Li et al. |
| 2010/0251206 A1 | 9/2010 | Horiuchi et al. |
| 2010/0251230 A1 | 9/2010 | O'Farrel et al. |
| 2010/0279653 A1 | 11/2010 | Poltorak |
| 2010/0295774 A1 | 11/2010 | Hennessey |
| 2010/0312546 A1 | 12/2010 | Chang et al. |
| 2011/0006603 A1 | 1/2011 | Robinson et al. |
| 2011/0007174 A1 | 1/2011 | Bacivarov et al. |
| 2011/0010171 A1 | 1/2011 | Talwar et al. |
| 2011/0010319 A1 | 1/2011 | Harada |
| 2011/0010424 A1 | 1/2011 | Fox et al. |
| 2011/0016333 A1 | 1/2011 | Scott et al. |
| 2011/0023111 A1 | 1/2011 | Gunadisastra et al. |
| 2011/0043490 A1 | 2/2011 | Powell et al. |
| 2011/0055901 A1 | 3/2011 | Karaoguz et al. |
| 2011/0055935 A1 | 3/2011 | Karaoguz et al. |
| 2011/0064331 A1 | 3/2011 | Andres Del Valle |
| 2011/0071841 A1 | 3/2011 | Fomenko et al. |
| 2011/0081023 A1 | 4/2011 | Raghuvanshi et al. |
| 2011/0091113 A1 | 4/2011 | Ito |
| 2011/0093459 A1 | 4/2011 | Dong et al. |
| 2011/0099538 A1 | 4/2011 | Pujala et al. |
| 2011/0129159 A1 | 6/2011 | Cifarelli |
| 2011/0135166 A1 | 6/2011 | Wechsler |
| 2011/0138064 A1 | 6/2011 | Rieger et al. |
| 2011/0144999 A1 | 6/2011 | Jang et al. |
| 2011/0153324 A1 | 6/2011 | Ballinger et al. |
| 2011/0158536 A1 | 6/2011 | Nakano |
| 2011/0167181 A1 | 7/2011 | Minoo et al. |
| 2011/0176058 A1 | 7/2011 | Biswas et al. |
| 2011/0177481 A1 | 7/2011 | Haff et al. |
| 2011/0179182 A1 | 7/2011 | Vadia Ravnas |
| 2011/0208980 A1 | 8/2011 | Brooks et al. |
| 2011/0225366 A1 | 9/2011 | Izadi et al. |
| 2011/0231676 A1 | 9/2011 | Atkins et al. |
| 2011/0283266 A1 | 11/2011 | Gallagher et al. |
| 2011/0289482 A1 | 11/2011 | Bentlye |
| 2011/0321029 A1 | 12/2011 | Kern et al. |
| 2012/0014560 A1 | 1/2012 | Obrador et al. |
| 2012/0027311 A1 | 2/2012 | Cok |
| 2012/0029661 A1 | 2/2012 | Jones et al. |
| 2012/0030325 A1 | 2/2012 | Silverman et al. |
| 2012/0030682 A1 | 2/2012 | Shaffer et al. |
| 2012/0054624 A1 | 3/2012 | Owens et al. |
| 2012/0065976 A1 | 3/2012 | Deng |
| 2012/0066642 A1 | 3/2012 | Shi |
| 2012/0071174 A1 | 3/2012 | Bao et al. |
| 2012/0072528 A1 | 3/2012 | Rimac et al. |
| 2012/0076427 A1 | 3/2012 | Hibino et al. |
| 2012/0078690 A1 | 3/2012 | Harriman et al. |
| 2012/0079372 A1 | 3/2012 | Kandekar et al. |
| 2012/0084086 A1 | 4/2012 | Gilbert |
| 2012/0096121 A1 | 4/2012 | Hao et al. |
| 2012/0106859 A1 | 5/2012 | Cheatle |
| 2012/0144288 A1 | 6/2012 | Caruso et al. |
| 2012/0179674 A1 | 7/2012 | Delling et al. |
| 2012/0188382 A1 | 7/2012 | Morrison et al. |
| 2012/0224388 A1 | 9/2012 | Lin |
| 2012/0225652 A1 | 9/2012 | Martinez et al. |
| 2012/0232885 A1 | 9/2012 | Barbosa et al. |
| 2012/0235887 A1 | 9/2012 | Border et al. |
| 2012/0242598 A1 | 9/2012 | Won et al. |
| 2012/0245944 A1 | 9/2012 | Gruber |
| 2012/0246458 A1 | 9/2012 | Jain et al. |
| 2012/0250535 A1 | 10/2012 | Delling et al. |
| 2012/0253799 A1 | 10/2012 | Bangalore |
| 2012/0253802 A1 | 10/2012 | Heck et al. |
| 2012/0254086 A1 | 10/2012 | Deng |
| 2012/0254153 A1 | 10/2012 | Abraham et al. |
| 2012/0254161 A1 | 10/2012 | Zhang et al. |
| 2012/0254227 A1 | 10/2012 | Heck et al. |
| 2012/0256967 A1 | 10/2012 | Baldwin et al. |
| 2012/0265531 A1 | 10/2012 | Bennett |
| 2012/0266140 A1 | 10/2012 | Bates |
| 2012/0269355 A1 | 10/2012 | Chandak et al. |
| 2012/0271617 A1 | 10/2012 | Nakajima et al. |
| 2012/0278430 A1 | 11/2012 | Lehane et al. |
| 2012/0290293 A1 | 11/2012 | Hakkani-Tur et al. |
| 2012/0293543 A1 | 11/2012 | Jardine-Skinner |
| 2012/0303565 A1 | 11/2012 | Deng et al. |
| 2012/0308124 A1 | 12/2012 | Belhumeur et al. |
| 2012/0310523 A1 | 12/2012 | Delling et al. |
| 2012/0313865 A1 | 12/2012 | Pearce |
| 2012/0317197 A1 | 12/2012 | De Foy et al. |
| 2012/0324069 A1 | 12/2012 | Nori et al. |
| 2012/0327040 A1 | 12/2012 | Simon et al. |
| 2012/0327042 A1 | 12/2012 | Harley et al. |
| 2012/0330887 A1 | 12/2012 | Young et al. |
| 2012/0331102 A1 | 12/2012 | Ertugrul |
| 2012/0331111 A1 | 12/2012 | Wu et al. |
| 2013/0013936 A1 | 1/2013 | Lin et al. |
| 2013/0014050 A1 | 1/2013 | Queru |
| 2013/0016055 A1 | 1/2013 | Chuang |
| 2013/0019175 A1 | 1/2013 | Kotler et al. |
| 2013/0021373 A1 | 1/2013 | Vaught et al. |
| 2013/0031476 A1 | 1/2013 | Coin et al. |
| 2013/0058274 A1 | 3/2013 | Scherzer et al. |
| 2013/0065576 A1 | 3/2013 | Basir |
| 2013/0073725 A1 | 3/2013 | Bordeleau et al. |
| 2013/0078869 A1 | 3/2013 | Golko et al. |
| 2013/0085756 A1 | 4/2013 | Chotimongkol et al. |
| 2013/0086461 A1 | 4/2013 | Ashley-Rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler |
| 2013/0091465 A1 | 4/2013 | Kikin-Gil et al. |
| 2013/0091534 A1 | 4/2013 | Gilde et al. |
| 2013/0094445 A1 | 4/2013 | De Foy et al. |
| 2013/0097481 A1 | 4/2013 | Kotler et al. |
| 2013/0097490 A1 | 4/2013 | Kotler et al. |
| 2013/0106725 A1 | 5/2013 | Bakken et al. |
| 2013/0106740 A1 | 5/2013 | Yilmaz et al. |
| 2013/0106977 A1 | 5/2013 | Chu et al. |
| 2013/0108065 A1 | 5/2013 | Mullins et al. |
| 2013/0115821 A1* | 5/2013 | Golko .................. H01R 13/516 439/638 |
| 2013/0117470 A1* | 5/2013 | Terlizzi .............. H01R 13/6683 710/3 |
| 2013/0117658 A1 | 5/2013 | Fidler et al. |
| 2013/0127982 A1 | 5/2013 | Zhang et al. |
| 2013/0128364 A1 | 5/2013 | Wheeler et al. |
| 2013/0132614 A1 | 5/2013 | Bajpai et al. |
| 2013/0138436 A1 | 5/2013 | Yu |
| 2013/0148864 A1 | 6/2013 | Dolson et al. |
| 2013/0151441 A1 | 6/2013 | Archambeau |
| 2013/0151681 A1 | 6/2013 | Dournov et al. |
| 2013/0151975 A1 | 6/2013 | Shadi et al. |
| 2013/0152092 A1 | 6/2013 | Yadgar |
| 2013/0156275 A1 | 6/2013 | Amacker et al. |
| 2013/0159021 A1 | 6/2013 | Felsher |
| 2013/0166742 A1 | 6/2013 | Wiener et al. |
| 2013/0173604 A1 | 7/2013 | Li et al. |
| 2013/0174047 A1 | 7/2013 | Sivakumar et al. |
| 2013/0179067 A1 | 7/2013 | Trowbridge et al. |
| 2013/0185065 A1 | 7/2013 | Tzirkel-Hancock et al. |
| 2013/0188032 A1 | 7/2013 | Vertegaal |
| 2013/0191781 A1 | 7/2013 | Radakovitz et al. |
| 2013/0212484 A1 | 8/2013 | Joshi et al. |
| 2013/0217414 A1 | 8/2013 | Nagaraj |

(56) References Cited

U.S. PATENT DOCUMENTS

| | | |
|---|---|---|
| 2013/0226587 A1 | 8/2013 | Cheung |
| 2013/0227398 A1 | 8/2013 | Bolstad |
| 2013/0227415 A1 | 8/2013 | Gregg et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0238819 A1 | 9/2013 | Oljaca et al. |
| 2013/0242964 A1 | 9/2013 | Hassan et al. |
| 2013/0243328 A1 | 9/2013 | Irie |
| 2013/0252636 A1 | 9/2013 | Chang et al. |
| 2013/0254412 A1 | 9/2013 | Menezes et al. |
| 2013/0266196 A1 | 10/2013 | Kono |
| 2013/0275779 A1 | 10/2013 | He |
| 2013/0293530 A1 | 11/2013 | Perez et al. |
| 2013/0297700 A1 | 11/2013 | Hayton et al. |
| 2013/0298185 A1 | 11/2013 | Koneru et al. |
| 2013/0321390 A1 | 12/2013 | Latta et al. |
| 2013/0335301 A1 | 12/2013 | Wong et al. |
| 2013/0346494 A1 | 12/2013 | Nakfour et al. |
| 2014/0004741 A1 | 1/2014 | Jol et al. |
| 2014/0006420 A1 | 1/2014 | Sparrow et al. |
| 2014/0007215 A1 | 1/2014 | Romano et al. |
| 2014/0019626 A1 | 1/2014 | Hubler et al. |
| 2014/0019896 A1 | 1/2014 | Satterfield |
| 2014/0025380 A1 | 1/2014 | Koch et al. |
| 2014/0029859 A1 | 1/2014 | Libin |
| 2014/0046914 A1 | 2/2014 | Das et al. |
| 2014/0050419 A1 | 2/2014 | Lerios et al. |
| 2014/0072242 A1 | 3/2014 | Wei et al. |
| 2014/0075523 A1 | 3/2014 | Tuomaala et al. |
| 2014/0098682 A1 | 4/2014 | Cao et al. |
| 2014/0107921 A1 | 4/2014 | Delling et al. |
| 2014/0108979 A1 | 4/2014 | Davidson et al. |
| 2014/0141635 A1 | 5/2014 | Saunders |
| 2014/0157169 A1 | 6/2014 | Kikin-gil |
| 2014/0173602 A1 | 6/2014 | Kikin-gil et al. |
| 2014/0181708 A1 | 6/2014 | Kikin-gil et al. |
| 2014/0210797 A1 | 7/2014 | Kreek et al. |
| 2014/0222729 A1 | 8/2014 | Dasgupta et al. |
| 2014/0253522 A1 | 9/2014 | Cueto |
| 2014/0257803 A1 | 9/2014 | Yu et al. |
| 2014/0258405 A1 | 9/2014 | Perkin |
| 2014/0282415 A1 | 9/2014 | Ovadia et al. |
| 2014/0297412 A1 | 10/2014 | Fong et al. |
| 2014/0317602 A1 | 10/2014 | Zuo |
| 2014/0341443 A1 | 11/2014 | Cao |
| 2014/0358537 A1 | 12/2014 | Gilbert |
| 2014/0359593 A1 | 12/2014 | Cohen et al. |
| 2014/0372112 A1 | 12/2014 | Xue et al. |
| 2014/0379326 A1 | 12/2014 | Sarikaya et al. |
| 2014/0379353 A1 | 12/2014 | Boies et al. |
| 2015/0100312 A1 | 4/2015 | Bocchieri |
| 2015/0161993 A1 | 6/2015 | Sainath |
| 2015/0161994 A1 | 6/2015 | Tang |
| 2015/0170020 A1 | 6/2015 | Garimella |
| 2015/0255061 A1 | 9/2015 | Xue et al. |
| 2015/0255069 A1 | 9/2015 | Adams et al. |
| 2015/0277682 A1 | 10/2015 | Kaufthal |
| 2015/0277708 A1 | 10/2015 | Rodrig et al. |
| 2015/0278191 A1 | 10/2015 | Levit et al. |
| 2015/0304165 A1 | 10/2015 | Menezes et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317510 A1 | 11/2015 | Lee |
| 2015/0324555 A1 | 11/2015 | Burba et al. |
| 2015/0324556 A1 | 11/2015 | Hunt et al. |
| 2015/0324601 A1 | 11/2015 | Burba et al. |
| 2015/0325236 A1 | 11/2015 | Levit |
| 2015/0327068 A1 | 11/2015 | Hunt et al. |
| 2015/0331240 A1 | 11/2015 | Poulos |
| 2015/0331463 A1 | 11/2015 | Obie et al. |
| 2015/0347120 A1 | 12/2015 | Garg et al. |
| 2015/0347274 A1 | 12/2015 | Taylor |
| 2015/0347734 A1 | 12/2015 | Beigi |
| 2015/0350333 A1 | 12/2015 | Cutler et al. |
| 2015/0356759 A1 | 12/2015 | Delling et al. |
| 2015/0363339 A1 | 12/2015 | Huang et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0373546 A1 | 12/2015 | Haugen et al. |
| 2015/0378515 A1 | 12/2015 | Powell |
| 2016/0203125 A1 | 7/2016 | Sarikaya et al. |
| 2016/0239987 A1 | 8/2016 | Negrila et al. |

FOREIGN PATENT DOCUMENTS

| | | |
|---|---|---|
| EP | 0553101 | 7/1997 |
| EP | 0816981 | 7/1998 |
| EP | 1055872 | 11/2000 |
| EP | 1174787 | 1/2002 |
| EP | 1331566 | 7/2003 |
| EP | 1628197 | 2/2006 |
| EP | 1965389 | 9/2008 |
| EP | 1970803 | 9/2008 |
| EP | 2096577 | 9/2009 |
| EP | 2267655 | 12/2010 |
| EP | 2312462 | 4/2011 |
| EP | 2482572 | 8/2012 |
| EP | 2575128 | 4/2013 |
| EP | 2590274 | 5/2013 |
| EP | 2650752 | 10/2013 |
| EP | 2701457 | 2/2014 |
| GB | 2431001 | 4/2007 |
| JP | S56140430 | 11/1981 |
| JP | 2002091477 | 3/2002 |
| KR | 20040076079 | 8/2004 |
| KR | 20130022513 | 3/2013 |
| WO | WO-9304468 | 3/1993 |
| WO | WO-0125943 | 4/2001 |
| WO | WO-0250590 | 6/2002 |
| WO | WO-2005013262 | 2/2005 |
| WO | WO-2005033934 | 4/2005 |
| WO | WO-2008124181 | 10/2008 |
| WO | WO-2009015047 | 1/2009 |
| WO | WO-2009082814 | 7/2009 |
| WO | WO-2009089308 | 7/2009 |
| WO | WO-2009128021 | 10/2009 |
| WO | WO-2010141403 | 12/2010 |
| WO | WO-2011014138 | 2/2011 |
| WO | WO-2011150403 | 12/2011 |
| WO | WO-2012152817 | 11/2012 |
| WO | WO-2013008026 | 1/2013 |
| WO | WO-2013048510 | 4/2013 |
| WO | WO-2013154561 | 10/2013 |
| WO | WO-2013171481 | 11/2013 |
| WO | WO-2013184225 | 12/2013 |

OTHER PUBLICATIONS

"Xcode OpenGL ES Tools Overview", Retrieved on: Jun. 5, 2014 Available at: https://developer.apple.com/library/prerelease/ios/documentation/3DDrawing/Conceptual/OpenGLES_ProgrammingGuide/ToolsOverview/ToolsOverview.html, 10 pages.

"Notice of Allowance", U.S. Appl. No. 13/367,377, Feb. 7, 2012, 10 pages.

"Failover Cluster Step-by-Step Guide: Validating Hardware for a Failover Cluster", http://technet.microsoft.com/en-us/library/cc732035(v=ws.10).aspx, Mar. 20, 2011, 10 pages.

"International Search Report and Written Opinion", Application No. PCT/US2015/024594, Jul. 24, 2015, 10 Pages.

"International Search Report and Written Opinion", Application No. PCT/US2015/030113, Aug. 7, 2015, 10 Pages.

"Creating Interactive Virtual Auditory Environments", IEEE Computer Graphics and Applications, Aug. 2002, 10 pages.

"Non-Final Office Action", U.S. Appl. No. 14/275,785, Aug. 26, 2015, 10 pages.

"International Search Report and the Written Opinion", Application No. PCT/US2015/036595, Sep. 24, 2015, 10 pages.

(56) References Cited

OTHER PUBLICATIONS

"Non-Final Office Action", U.S. Appl. No. 14/266,795, Oct. 7, 2015, 10 pages.
"Notice of Allowance", U.S. Appl. No. 14/275,806, Oct. 8, 2015, 10 pages.
"Notice of Allowance", U.S. Appl. No. 12/970,939, Dec. 19, 2014, 10 pages.
"Notice of Allowance", U.S. Appl. No. 12/970,943, Dec. 19, 2014, 10 pages.
"Final Office Action", U.S. Appl. No. 14/275,785, Feb. 9, 2016, 11 pages.
"International Search Report and the Written Opinion", Application No. PCT/US2015/017872, Jun. 25, 2015, 11 pages.
"International Search Report and Written Opinion", Application No. PCT/US2015/030104, Aug. 7, 2015, 11 Pages.
"International Search Report and Written Opinion", Application No. PCT/US2015/030096, Aug. 19, 2015, 11 Pages.
"International Search Report and the Written Opinion", Application No. PCT/US2015/033545, Aug. 20, 2015, 11 pages.
"International Search Report and Written Opinion", Application No. PCT/US2015/036587, Oct. 8, 2015, 11 Pages.
"International Search Report and the Written Opinion", Application No. PCT/US2015/022887, Jun. 26, 2015, 12 pages.
"International Search Report and the Written Opinion", Application No. PCT/US2015/029334, Jul. 7, 2015, 12 pages.
"International Search Report and Written Opinion", Application No. PCT/US2015/032089, Jul. 31, 2015, 12 pages.
"International Search Report and the Written Opinion", Application No. PCT/US2015/033872, Sep. 2, 2015, 12 pages.
"International Search Report and the Written Opinion", Application No. PCT/US2015/035219, Sep. 29, 2015, 12 pages.
"Non-Final Office Action", U.S. Appl. No. 13/920,323, Feb. 27, 2015, 13 pages.
"Microsoft CodeLens Code Health Indicator extension", <<https://developer.apple.com/library/ios/documentation/ToolsLanguages/Conceptual/Xcode_Overview/DebugYourApp/DebugYourApp.html>>, Mar. 10, 2014, 13 pages.
"International Search Report and the Written Opinion", Application No. PCT/US2015/027689, Jul. 8, 2015, 13 pages.
"International Search Report and Written Opinion", Application No. PCT/US2015/027409, Jul. 22, 2015, 13 pages.
"International Search Report and Written Opinion", Application No. PCT/US2015/028383, Jul. 24, 2015, 13 pages.
"International Search Report and Written Opinion", Application No. PCT/US2015/030153, Aug. 7, 2015, 13 Pages.
"Notice of Allowance", U.S. Appl. No. 14/312,562, Sep. 18, 2015, 13 pages.
"Final Office Action", U.S. Appl. No. 13/327,794, Nov. 20, 2014, 13 pages.
"Non-Final Office Action", U.S. Appl. No. 14/312,501, Dec. 16, 2015, 14 pages.
"Non-Final Office Action", U.S. Appl. No. 14/304,174, Jun. 29, 2015, 15 pages.
"International Search Report and the Written Opinion", Application No. PCT/US2015/026971, Jul. 24, 2015, 15 pages.
"International Search Report and Written Opinion", Application No. PCT/US2015/031270, Sep. 4, 2015, 16 Pages.
"International Search Report and the Written Opinion", Application No. PCT/US2014/041023, Mar. 6, 2015, 17 pages.
"International Search Report and Written Opinion", Application No. PCT/US2015/022886, Aug. 31, 2015, 17 pages.
"International Search Report and Written Opinion", Application No. PCT/US2015/036859, Dec. 22, 2015, 17 pages.
"Final Office Action", U.S. Appl. No. 14/273,100, Mar. 3, 2016, 18 pages.
"Non-Final Office Action", U.S. Appl. No. 14/257,502, Feb. 1, 2016, 19 pages.
"International Search Report and the Written Opinion", Application No. PCT/US2015/036767, Sep. 14, 2015, 19 pages.

"Advisory Action", U.S. Appl. No. 14/304,911, Jan. 14, 2016, 2 pages.
"Acoustics—Measurement of room acoustic parameters—Part 1: Performance spaces", in ISO 3382-1:2009, May 6, 2014, 2 pages.
"GPU-Accelerated Route Planning", https://www.cs.unc.edu/cms/research/summaries/GPUAcceleratedRoutePlanning.pdf, Aug. 2005, 2 pages.
"Corrected Notice of Allowance", U.S. Appl. No. 14/275,806, Nov. 3, 2015, 2 pages.
"Unified Communications Interoperability Forum and Open Networking Foundation Announce Collaborative Relationship Between Unified Communications and Software-Defined Networks", Retrieved From: <http://www.businesswire.com/news/home/20131120005275/en/Unified-Communications-Interoperability-Forum-Open-Networking-Foundation> Mar. 7, 2014, Nov. 20, 2013, 2 Pages.
"Unified Communications Managed API 3.0 Core SDK Documentation", retrieved from: http://msdn.microsoft.com/en-us/library/gg421023.aspx on Feb. 14, 2012, Dec. 1, 2011, 2 pages.
"Types of vCloud Hybrid Service", Available at: http://pubs.vmware.com/vchs/index.jsp?topic=%2FGUID-FD4D5E84-1AB8-4A1B-8C3F-769176FCD154%2FGUID-375065F3-110A-4B84-99FA-FB8467361960.html, Dec. 16, 2012, 2 pages.
"Connecting to Multiple 802.11 Networks from One WiFi Card Simultaneously", Retrieved From: <http://marketplace.yet2.com/app/insight/techofweek/38576> Nov. 18, 2013, Jun. 20, 2012, 2 Pages.
"Centrally Managed Wireless Networks", Retrieved From: <http://www.burconix.com/?p=services-centrally-managed-wireless> Nov. 18, 2013, Sep. 5, 2013, 2 Pages.
"Flexible Schema for Language Model Customization", U.S. Appl. No. 14/227,492, filed Mar. 27, 2014, 20 pages.
"Low-Footprint Adaptation and Personalization fora Deep Neural Network", U.S. Appl. No. 14/201,704, filed Mar. 7, 2014, 20 pages.
"Non-Final Office Action", U.S. Appl. No. 14/273,100, Oct. 1, 2015, 20 pages.
"International Search Report and Written Opinion", Application No. PCT/US2015/029805, Oct. 15, 2015, 20 pages.
"Shared Hidden Layer Combination for Speech Recognition Systems", U.S. Appl. No. 14/265,110, filed Apr. 29, 2014, 22 pages.
"Non-Final Office Action", U.S. Appl. No. 14/456,679, Jun. 19, 2015, 22 pages.
"UI Element Guidelines: Menus", Available at: https://developer.apple.com/library/mac/documentation/userexperience/conceptual/applehiguidelines/Menus/Menus.html, Sep. 26, 2011, 22 pages.
"Non-Final Office Action", U.S. Appl. No. 14/281,518, Feb. 26, 2016, 23 pages.
"Cisco Bring Your Own Device", Available at: http://www.cisco.com/c/en/us/td/docs/solutions/Enterprise/Borderless_Networks/Unified_Access/byodwp.html, Mar. 2014, 23 Pages.
"Non-Final Office Action", U.S. Appl. No. 12/970,949, Jan. 2, 2015, 24 pages.
"Non-Final Office Action", U.S. Appl. No. 13/903,944, Mar. 27, 2015, 24 pages.
"Final Office Action", U.S. Appl. No. 13/920,323, Sep. 24, 2015, 24 pages.
"Final Office Action", U.S. Appl. No. 12/970,949, Jun. 10, 2015, 25 pages.
"Final Office Action", U.S. Appl. No. 14/456,679, Nov. 2, 2015, 26 pages.
"Integrated Vapor Chamber for Thermal Management of Computing Devices", U.S. Appl. No. 14/294,040, filed Jun. 2, 2014, 27 pages.
"Interactive 3D Audio Rendering Guidlelines, Level 2.0", In proceedings of 3D Working Group of the Interactive Audio Special Interest Group, Sep. 20, 1999, 29 pages.
"Interest Point Detection", Available at: http://en.wikipedia.org/wiki/Interest_point_detection, Apr. 21, 2014, 3 pages.
"Debug Navigator Help: Using Debug Gauges", https://developer.apple.com/library/mac/recipes/xcode_help-debug_navigator/articles/using_debug_gauges.html#//apple_ref/doc/uid/TP40010432-CH8-SW1, May 28, 2014, 3 pages.

(56) References Cited

OTHER PUBLICATIONS

"Non-Final Office Action", U.S. Appl. No. 13/530,015, Apr. 28, 2015, 32 pages.
"Non-Final Office Action", U.S. Appl. No. 14/227,492, Aug. 13, 2015, 36 pages.
"The Ribbon Bar", Available at: http://bioinf.scri.ac.uk/tablet/help/ribbon.shtml, Dec. 1, 2012, 36 pages.
"Corporate Telecommunication Networks—Mobility for Enterprise Communications", ECMA/TC32-TG17/2010/056, XP050514180, Geneva [retrieved on Nov. 4, 2010], Oct. 2010, 38 pages.
"Preinterview First Office Action", U.S. Appl. No. 14/444,987, Mar. 3, 2016, 4 pages.
"Final Office Action", U.S. Appl. No. 13/530,015, Nov. 19, 2014, 48 pages.
"Second Written Opinion", Application No. PCT/US2015/022887, Jan. 7, 2016, 5 pages.
"Notice of Allowance", U.S. Appl. No. 14/275,761, Mar. 2, 2016, 5 pages.
"Lifecycle Services for Microsoft Dynamics User Guide (LCS) [AX 2012]", Available at: http://technet.microsoft.com/en-us/library/dn268616.aspx, Aug. 8, 2013, 5 pages.
"Notice of Allowance", U.S. Appl. No. 13/026,058, Nov. 7, 2014, 5 pages.
"Notice of Allowance", U.S. Appl. No. 13/923,969, Nov. 30, 2015, 5 pages.
"Connectify pro FULL+KEY 7 MB", Retrieved From: <http://zonreturn.blogspot.mx/2013/05/connectify-pro-fullkey-7-mb.html> Nov. 14, 2013, May 14, 2013, 5 Pages.
"Step by Step Microsoft Word 2013", Available at: https://dbgyan.files.wordpress.com/2013/02/0735669120_wor.pdf, Mar. 1, 2013, 576 pages.
"Ribbon Layout and Resizing", Retrieved on Mar. 12, 2014 at: https://msdn.microsoft.com/en-us/library/ff701790, 6 pages.
"Non-Final Office Action", U.S. Appl. No. 14/311,208, Jan. 7, 2016, 6 pages.
"Final Office Action", U.S. Appl. No. 14/275,274, Jan. 29, 2016, 6 pages.
"Second Written Opinion", Application No. PCT/US2015/027688, Feb. 9, 2016, 6 pages.
"Restriction Requirement", U.S. Appl. No. 14/275,785, Jun. 5, 2015, 6 pages.
"Non-Final Office Action", U.S. Appl. No. 14/201,704, Jul. 1, 2015, 6 pages.
"Non-Final Office Action", U.S. Appl. No. 14/304,911, Jul. 17, 2015, 6 pages.
"Restriction Requirement", U.S. Appl. No. 14/279,146, Sep. 3, 2015, 6 pages.
"International Preliminary Report on Patentability", Application No. PCT/US2014/041014, Sep. 15, 2015, 6 pages.
"Final Office Action", U.S. Appl. No. 13/923,917, Sep. 29, 2015, 6 pages.
"Second Written Opinion", Application No. PCT/US2015/030153, Dec. 4, 2015, 6 pages.
"Final Office Action", U.S. Appl. No. 14/275,761, Dec. 18, 2015, 6 pages.
"Notice of Allowance", U.S. Appl. No. 14/304,911, Feb. 19, 2016, 7 pages.
"Non-Final Office Action", U.S. Appl. No. 14/264,012, Mar. 10, 2016, 7 pages.
"Non-Final Office Action", U.S. Appl. No. 13/923,969, May 6, 2015, 7 pages.
"Non-Final Office Action", U.S. Appl. No. 14/264,012, Jul. 31, 2015, 7 pages.
"Notice of Allowance", U.S. Appl. No. 13/923,969, Oct. 1, 2015, 7 pages.
"Deployment Planning Tips for Office 365", http://technet.microsoft.com/en-us/library/hh852435.aspx, Oct. 14, 2012, 7 pages.
"Final Office Action", U.S. Appl. No. 14/304,911, Nov. 13, 2015, 7 pages.
"Second Written Opinion", Application No. PCT/US2015/030104, Dec. 4, 2015, 7 pages.
"Notice of Allowance", U.S. Appl. No. 14/264,012, Dec. 18, 2015, 7 pages.
"New CodeLens Indicator—Incoming Changes", <<http://msdn.microsoft.com/en-us/library/dn269218.aspx>>, retrieved May 23, 2014,, 8 pages.
"Non-Final Office Action", U.S. Appl. No. 14/275,724, Sep. 23, 2015, 8 pages.
"Non-Final Office Action", U.S. Appl. No. 14/275,761, Sep. 24, 2015, 8 pages.
"Secure Separation in Cisco Unified Data Center Architecture", Available at: http://www.cisco.com/en//solutions/collateral/ns340/ns414/ns742/ns743/ns1050/white_paper_c11-722425.html, Oct. 1, 2013, 8 pages.
"Notice of Allowance", U.S. Appl. No. 14/304,174, Dec. 14, 2015, 8 pages.
"How to Set Up a Wireless Hotspot—From Ethernet (Windows 7)", Available At: <http://www.instructables.com/id/How-to-Set-Up-a-Wireless-Hotspot-Windows-7/>, Apr. 3, 2012, 8 pages.
"Notice of Allowance", U.S. Appl. No. 14/312,562, Jan. 7, 2016, 9 pages.
"Notice of Allowance", U.S. Appl. No. 14/275,806, Feb. 25, 2016, 9 pages.
"Non-Final Office Action", U.S. Appl. No. 13/923,917, May 28, 2015, 9 pages.
"International Search Report and the Written Opinion", Application No. PCT/US2015/027688, Sep. 7, 2015, 9 pages.
"International Search Report and the Written Opinion", Application No. PCT/US2014/041014, Oct. 2, 2014, 9 pages.
"Notice of Allowance", U.S. Appl. No. 14/254,681, Dec. 4, 2015, 9 pages.
"Non-Final Office Action", U.S. Appl. No. 14/279,146, Dec. 8, 2015, 9 pages.
Abad, "Context Dependent Modelling Approaches for Hybrid Speech Recognizers", In Proceeding of INTERSPEECH, Sep. 26, 2010, 4 pages.
Abdel-Hamid, "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Abid, "A New Neural Network Pruning Method Based on the Singular Value Decomposition and the Weight Initialisation", In Proceedings of 11th European Signal Processing Conference, Sep. 3, 2002, 4 pages.
Abraham, "Hierarchical Hub Labelings for Shortest Paths", In Technical Report MSR-TR-MSR-TR-2012-46, Apr. 2012, 15 pages.
Adams, "The Next Generation of USB Connector Will Plug in Either Way", Retrieved From: <http://www.popsci.com/article/gadgets/next-generation-usb-connector-will-plug-either-way> May 16, 2014, Dec. 4, 2013, 3 Pages.
Ajdler, "The Plenacoustic Function and Its Sampling", In IEEE Transactions on Signal Processing, vol. 54, Issue 10, Oct. 2006, 35 pages.
Ajmani, "Scheduling and Simulation: How to Upgrade Distributed Systems", In Proceedings of the 9th conference on Hot Topics in Operating Systems, vol. 9., May 18, 2013, 6 pages.
Ajwani, "Breadth First Search on Massive Graphs", In Proceedings of the 9th DIMACS Implementation Challenge: The Shortest Path Problem, Nov. 2006, 15 pages.
Al-Hazmi, "Virtualization of 802.11 Interfaces for Wireless Mesh Networks", In Proceeding: Eighth International Conference on Wireless On-Demand Network Systems and Services, Computer Networks and Computer Communications Lab University of Passau, 94032 Passau, Germany, Jan. 26, 2011, pp. 44-51.
Al-Kanj, "Optimized Energy Efficient Content Distribution over Wireless Networks with Mobile-to-Mobile Cooperation", In Proceeding: The IEEE 17th International Conference on Telecommunications, Department of Electrical and Computer Engineering, American University of Beirut, Apr. 4, 2010, pp. 471-475.
Alt, "Increasing the User's Attention on the Web: Using Implicit Interaction Based on Gaze Behavior to Tailor Content", In Proceed-

(56) References Cited

OTHER PUBLICATIONS ings of the 7th Nordic Conference on Human-Computer Interaction—Making Sense through Design, Oct. 14, 2012, 10 pages.
Ananthanarayanan, "COMBINE: Leveraging the Power of Wireless Peers through Collaborative Downloading", In Proceedings: The 5th International Conference on Mobile Systems, Applications and Services, Jun. 11, 2007, pp. 286-298.
Ananthanarayanan, "Collaborative Downloading for Multi-homed Wireless Devices", In Proceedings: Eighth IEEE Workshop on Mobile Computing Systems and Applications, Mar. 8, 2007, pp. 79-84.
Azizyan, "SurroundSense: Mobile Phone Localization via Ambience Fingerprinting", In Proceedings of the 15th annual international conference on Mobile computing and networking, Sep. 20, 2009, 12 pages.
Barman, "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Barrett, "Implementations of Routing Algorithms for Transportation Networks", In Proceedings of the 9th DIMACS Implementation Challenge: The Shortest Path Problem, Nov. 2006, 19 pages.
Bast, "Route Planning in Transportation Networks", In Technical Report MSR-TR-2014-4, Jan. 8, 2014, 57 pages.
Bast, "Fast Routing in Road Networks with Transit Nodes", In Proceedings of Science, vol. 316, No. 5824, Apr. 27, 2007, p. 566.
Belhumeur, "Eigenfaces vs. Fisherfaces: Recognition Using Class Specific Linear Projection", IEEE Transactions on Pattern Analysis and Machine Intelligence, Jul. 1997, pp. 711-720.
Beymer, "WebGazeAnalyzer: A System for Capturing and Analyzing Web Reading Behavior Using Eye Gaze", In Proceedings of Extended Abstracts on Human Factors in Computing Systems, Apr. 2, 2005, 10 pages.
Bleiweiss, "GPU Accelerated Pathfinding", In Proceedings of the 23rd ACM Siggraph/Eurographics symposium on Graphics hardware, Jun. 20, 2008, pp. 65-74.
Bohus, "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Bonzi, "The Use of Anaphoric Resolution for Document Description in Information Retrieval", In Proceedings of Information Processing & Management, vol. 25, Issue 4, Jun. 1989, 14 pages.
Bradley, "Accuracy and Reproducibility of Auditorium Acoustics Measures", In Proceedings of British Institute of Acoustics, vol. 10, May 6, 2014, 2 pages.
Broder, "A Taxonomy of Web Search", In Proceedings of ACM SIGIR Forum, vol. 36, Issue 2, Sep. 2002, 8 pages.
Burges, "From Ranknet to Lambdarank to Lambdamart: An Overview", In Microsoft Research Technical Report MSR-TR-2010-82, Jun. 23, 2010, 19 pages.
Burges, "Learning to Rank with Nonsmooth Cost Functions", In Proceedings of the Advances in Neural Information Processing Systems, Dec. 2006, 8 pages.
Buscher, "Generating and Using Gaze-Based Document Annotations", In Proceedings of Extended Abstracts on Human Factors in Computing Systems, Apr. 5, 2008, 6 pages.
Calamia, "Advances in Edge-Diffraction Modeling for Virtual-Acoustic Simulations", In Doctoral Dissertation of Princeton University, Jun. 2009, 159 pages.
Calian, "Passage-Level Evidence in Document Retrieval", In Proceedings of the 17th Annual International ACM SIGIR Conference on Research and Development in Information Retrieval, Jul. 3, 1994, 9 Pages.
Cao, "Face Recognition with Learning-based Descriptor", In Proceedings of the IEEE Conference on Computer Vision and Pattern Recognition (CVPR), Jun 2010, 8 pages.
Castro, "A Probabilistic Room Location Service for Wireless Networked Environments", In Proceedings of the 3rd international conference on Ubiquitous Computing, Sep. 30, 2001, 19 pages.
Chandak, "AD-Frustum: Adaptive Frustum Tracing for Interactive Sound Propagation", In IEEE Transactions on Visualization and Computer Graphics, vol. 14, Issue 6, Nov. 2008, 8 pages.
Chandra, "MultiNet: Connecting to Multiple IEEE 802.11 Networks Using a Single Wireless Card", In Proceedings: IEEE INFOCOM, The 23rd Annual Joint Conference of the IEEE Computer and Communications Societies, Mar. 7, 2004, 12 Pages.
Chandrasekaran, "Sparse and Low-Rank Matrix Decompositions";, IFAC Symposium on System Identification, 2009, 6 pages.
Chen, "Supplemental Material for "Bayesian Face Revisited: A Joint Formulation"", Apr. 2013, 5 pages.
Chen, "Building Language Model on Continuous Space using Gaussian Mixture Models", In Proceedings of Research in Language Modeling, Jan. 2007, 66 pages.
Chen, "Bayesian Face Revisited: A Joint Formulation", In Proceedings of the 12th European Conference on Computer Vision (ECCV), Oct. 2012, 14 pages.
Cheng, "Entityrank: Searching Entities Directly and Holistically", In Proceedings of the 33rd International Conference on Very Large Data Bases, Sep. 23, 2007, 12 pages.
Cheng, "Heritage and Early History of the Boundary Element Method", In Proceedings of Engineering Analysis with Boundary Elements, vol. 29, Issue 3, Mar. 2005, 35 pages.
Chi, "Visual Foraging of Highlighted Text: An Eye-Tracking Study", In Proceedings of the 12th International Conference on Human-Computer Interaction—Intelligent Multimodal Interaction Environments, Jul. 22, 2007, 10 pages.
Choi, "Face Annotation for Personal Photos Using Collaborative Face Recognition In Online Social Networks", In 16th International Conference on Digital Signal Processing, Jul. 5, 2009, 8 pages.
Choudhury, "A Framework for Robust Online Video Contrast Enhancement Using Modularity Optimization", In IEEE Transactions on Circuits and Systems for Video Technology, vol. 22 , Issue: 9, Sep. 2012, 14 pages.
Clarke, "Exploiting Redundancy in Question Answering", In Proceedings of the 24th Annual International ACM SIGIR Conference on Research and Development in Information Retrieval, Sep. 9, 2001, 8 pages.
Cootes, "Modeling Facial Shape and Appearance", Handbook of Face Recognition, Springer, New York, US, 2005, pp. 39-63.
Cormen, "Introduction to Algorithms", The MIT Press, Jul. 31, 2009, 43 pages.
Cucerzan, "Large-Scale Named Entity Disambiguation Based on Wikipedia Data", In Proceedings of the Joint Conference on Empirical Methods in Natural Language Processing and Computational Natural Language Learning, Jun. 28, 2007, 9 Pages.
Cvetkovic, "Image enhancement circuit using nonlinear processing curve and constrained histogram range equalization", Visual Communications and Image Processing 2004, Jan. 7, 2004, 12 pages.
Dahl, "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, "Large Vocabulary Continuous Speech Recognition with Context-Dependent DBN-HMMs", In IEEE International Conference on Acoustics, Speech and Signal Processing, May 22, 2011, 4 pages.
Davis, "Low-Rank Approximations for Conditional Feedforward Computation in Deep Neural Networks", In Proceedings of ArXiv preprint arXiv: 1312.4461, Dec. 2013, 10 Pages.
Davis, "Information—Theoretic Metric Learning", In Proceedings of the 24th International Conference on Machine Learning (ICML), Jun. 2007, 8 pages.
Delano, "Integrated Development Environments for Natural Language Processing", Available at: http://www.textanalysis.com/TAI-IDE-WP.pdf, Oct. 2001, 13 pages.
Delling, "PHAST: Hardware-Accelerated Shortest Path Trees", In Journal of Parallel and Distributed Computing, vol. 73, No. 7, Jul. 2013, 11 pages.
Delling, "Customizing Driving Directions With GPUs", In Proceedings of the 20th Euro-Par International Conference on Parallel Processing, Aug. 2014, 12 pages.

(56) References Cited

OTHER PUBLICATIONS

Delling, "High-Performance Multi-Level Graphs", In Proceedings of the 9th DIMACS Implementation Challenge: The Shortest Path Problem, Nov. 2006, 13 pages.
Delling, "Graph Partitioning with Natural Cuts", In Proceedings of the IEEE International Parallel & Distributed Processing Symposium, May 16, 2011, 15 pages.
Delling, "Customizable Route Planning", U.S. Appl. No. 13/152,313, filed Jun. 3, 2011, 23 pages.
Delling, "Query Scenarios for Customizable Route Planning", U.S. Appl. No. 13/649,114, filed Oct. 11, 2012, 27 pages.
Delling, "Highway Hierarchies Star", In Proceedings of the 9th DIMACS Implementation Challenge: The Shortest Path Problem, Nov. 2006, 29 pages.
Delling, "Customizable Route Planning", U.S. Appl. No. 13/868,135, filed Apr. 23, 2013, 33 pages.
Delling, "Customizable Route Planning", In Proceedings of the 10th International Symposium on Experimental Algorithms, May 2011, pp. 1-12.
Delling, "Faster Customization of Road Networks", In Proceedings of the 12th International Symposium on Experimental Algorithms, Jun. 5, 2013, pp. 1-12.
Delling, "Customizable Route Planning in Road Networks", In Proceedings of the Sixth Annual Symposium on Combinatorial Search, Jul. 2011, pp. 1-31.
Demetrescu, "The Shortest Path Problem: Ninth DIMACS Implementation Challenge", In Proceedings of DIMACS Series in Discrete Mathematics and Theoretical Computer Science, Jul. 28, 2009, 3 pages.
Diez, "Optimization of a Face Verification System Using Bayesian Screening Techniques", In Proceedings of the 23rd IASTED International Multi-Conference on Artificial Intelligence and Applications, Feb. 2005, pp. 427-432.
Ding, "Handbook of Face Recognition, Chapter 12: Facial Landmark Localization", Jan. 1, 2011, 19 pages.
Dong, "Image Retargeting by Content-Aware Synthesis", IEEE Transactions on Visualization and Computer Graphics, vol., No., June 2014, Mar. 26, 2014, 14 pages.
dos "LUP: A Language Understanding Platform", A Dissertation for the Degree of Master of Information Systems and Computer Engineering, Jul. 2012, 128 pages.
Eagle, "Common Sense Conversations: Understanding Casual Conversation using a Common Sense Database", In Proceedings of the Artificial Intelligence, Information Access, and Mobile Computing Workshop, Aug. 2003, 6 pages.
Edens, "An Investigation of Broad Coverage Automatic Pronoun Resolution for Information Retrieval", In Proceedings of the 26th Annual International ACM SIGIR Conference on Research and Development in Information Retrieval, Jul. 28, 2003, 2 pages.
Edmonds, "Single-Source Shortest Paths With the Parallel Boost Graph Library", In Proceedings of the 9th DIMACS Implementation Challenge: The Shortest Path Problem, Nov. 4, 2006, 20 pages.
Efentakis, "Optimizing Landmark-Based Routing and Preprocessing", In Proceedings of the Sixth ACM SIGSPATIAL International Workshop on Computational Transportation Science, Nov. 5, 2013, 6 pages.
ElRakabawy, "Peer-to-Peer File Transfer in Wireless Mesh Networks", In Proceeding: The Fourth Annual Conference on Wireless on Demand Network Systems and Services, University of Leipzig Department of Computer Science Aug. 10-11 04109 Leipzig, Germany, Jan. 24, 2007, pp. 114-121.
Fang, "A Formal Study of Information Retrieval Heuristics", In Proceedings of the 27th Annual International ACM SIGIR Conference on Research and Development in Information Retrieval, Jul. 25, 2004, 8 pages.
Ferguson, "Five Key Criteria for adaptable SDN Wi-Fi", Retrieved From: <http://www.extremenetworks.com/five-key-criteria-for-adaptable-sdn-wi-fi/> Mar. 7, 2014, Nov. 25, 2013, 7 Pages.

Finkel, "Incorporating Non-Local Information into Information Extraction Systems by Gibbs Sampling", In Proceedings of the 43rd Annual Meeting on Association for Computational Linguistics, Jun. 2005, 8 pages.
Fiore, "Information Density Estimation for Content Retrieval in MANETs", In Proceedings: The IEEE Transactions on Mobile Computing, vol. 8, Issue 3, Mar. 2009, pp. 289-303.
Florescu, "Towards a Peer-Assisted Content Delivery Architecture", In Proceedings: The 18th International Conference on Control Systems and Computer Science, May 2011, 8 pages.
Funkhouser, "Realtime Acoustic Modeling for Distributed Virtual Environments", In Proceedings of the 26th annual conference on Computer graphics and interactive techniques, Jul. 1, 1999, 10 pages.
Funkhouser, "A Beam Tracing Method for Interactive Architectural Acoustics", In Journal of the Acoustical Society of America, Feb. 2004, 18 pages.
Gade, "Acoustics in Halls for Speech and Music", In Springer Handbook of Acoustics, May 6, 2014, 8 pages.
Gajos, "Automatically Generating Personalized User Interfaces with Supple", In Proceedings of Artificial Intelligence, vol. 174, Issue, Aug. 1, 2010, 49 pages.
Gajos, "Exploring the Design Space for Adaptive Graphical User Interfaces", In Proceedings of the Working Conference on Advanced Visual Interfaces, May 6, 2006, 8 pages.
Geisberger, "Efficient Routing in Road Networks with Turn Costs", In Proceedings of the 10th International Conference on Experimental Algorithms, May 5, 2011, 12 pages.
Geisberger, "Exact Routing in Large Road Networks using Contraction Hierarchies", In Proceedings of Transportation Science, vol. 46, No. 3, Aug. 2012, 17 pages.
Gemello, "Adaptation of Hybrid ANN/HMM Models Using Linear Hidden Transformations and Conservative Training", In IEEE International Conference on Acoustics, Speech and Signal Processing, May 14, 2006, 4 pages.
Goldberg, "Better Landmarks within Reach", In Proceedings of the 6th International Conference on Experimental Algorithms, Jun. 6, 2007, 14 Pages.
Goldstein, "Summarizing Text Documents: Sentence Selection and Evaluation Metrics", In Proceedings of the 22nd Annual International ACM SIGIR Conference on Research and Development in Information Retrieval, Aug. 1, 1999, 8 pages.
Gooch, "Color2Gray: Salience-Preserving Color Removal", In Journal of ACM Transactions on Graphics, vol. 24 Issue 3, Jul. 2006.
Grasset, "Image-Driven View Management for Augmented Reality Browsers", IEEE International Symposium on Mixed and Augmented Reality (ISMAR), Nov. 5, 2012, 10 pages.
Gruenstein, "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Guillaumin, "Is that you? Metric Learning Approaches for Face Identification", In Proceedings of 12th IEEE International Conference on Computer Vision (ICCV), Sep. 2009, 8 pages.
Gumerov, "Fast multipole methods on graphics processors", In Journal of Computational Physics, vol. 227, Issue 18, Sep. 10, 2008, 4 pages.
Harper, "Within-Document Retrieval: A User-Centred Evaluation of Relevance Profiling", In Journal of Information Retrieval, vol. 7, Issue 3-4, Sep. 2004, 26 pages.
Harper, "A Language Modelling Approach to Relevance Profiling for Document Browsing", In Proceedings of the 2nd ACM/IEEE-CS Joint Conference on Digital Libraries, Jul. 13, 2007, 8 pages.
Harris, "On the use of windows for harmonic analysis with the discrete Fourier transform", In Proceedings of the IEEE vol. 66, Issue 1, Jan. 1978, 33 pages.
Hawamdeh, "Paragraph-based nearest neighbour searching in full-text documents", In Proceedings of Electronic Publishing, vol. 2, Dec. 1989, 14 pages.
He, "What is Discriminative Learning", Discriminative Learning for Speech Recognition Theory and Practice, Achorn International, Jun. 25, 2008, 25 pages.

(56) References Cited

OTHER PUBLICATIONS

Hearst, "Tilebars: Visualization of Term Distribution Information in Full Text Information Access", In Proceedings of the SIGCHI Conference on Human Factors in Computing Systems, May 7, 1995, 8 pages.
Heck, "Robustness to Telephone Handset Distortion in Speaker Recognition by Discriminative Feature Design", In Journal of Speech Communication—Speaker Recognition and its Commercial and Forensic Applications, vol. 31, Issue 2-3, Jun. 2000, 12 pages.
Hefeeda, "A Framework for Cost-Effective Peer-to-Peer Content Distribution", In Proceedings: The Eleventh ACM International Conference on Multimedia, Department of Computer Sciences Purdue University, West Lafayette, IN 47907, Nov. 2, 2003, 2 Pages.
Hinton, "Deep Neural Networks for Acoustic Modeling in Speech Recognition", In IEEE Signal Processing Magazine, vol. 29, Issue 6, Nov. 2012, 27 pages.
Hodgson, "Experimental evaluation of radiosity for room sound-field prediction", In the Journal of the Acoustical Society of America, Aug. 2006, 12 pages.
Hoffmeister, "Log-linear Model Combination with Word-dependent Scaling Factors", Human Language Technology and Pattern Recognition Computer Science Department, 2009, 4 pages.
Holzer, "Engineering Multilevel Overlay Graphs for Shortest-Path Queries", In ACM Journal of Experimental Algorithmics, vol. 13, Sep. 2008, 26 pages.
Hsu, "HBCI: Human-Building-Computer Interaction", In Proceedings of the 2nd ACM Workshop on Embedded Sensing Systems for Energy-Efficiency in Building, Nov. 2, 2010, 6 pages.
Huang, "Labeled Faces in the Wild: A Database for Studying Face Recognition in Unconstrained Environments", In Proceedings of the 10th European Conference on Computer Vision (ECCV), Oct. 2008, 11 pages.
Huang, "Unified Stochastic Engine (USE) for Speech Recognition", School of Computer Science, 1993, 4 pages.
Hughes, "Apple's Lightning Port Dynamically Assigns Pins to Allow for Reversible Use", Retrieved From: <http://appleinsider.com/articles/12/09/25/apples_lightning.port_dynamically_assigns_pins_to_allow_for_reversible_use> May 16, 2014, Sep. 25, 2012, 9 pages.
Ioffe, "Probabilistic Linear Discriminant Analysis", International Journal of Computer Vision, Jun. 2001, 12 pages.
Jacob, "QR Directory App—Overview", In Blog of Josh Jacob Dev, Apr. 21, 2011, 3 pages.
Jaiswal, "Bulk Content Delivery Using Co-Operating End-Nodes with Upload/Download Limits", In Proceedings: Fifth International Conference on Communication Systems and Networks, Bell Labs Research India, Bangalore, India, Sep. 10, 2012, 11 Pages.
Jaitly, "Application of Pretrained Deep Neural Networks to Large Vocabulary Conversational Speech Recognition", In Proceedings of 13th Annual Conference of the International Speech Communication Association, Mar. 12, 2012, 11 pages.
Jluedemann, "Networking & wireless forum: How to set up Dual Network Adapters", Retrieved From: <http://forums.cnet.com/7723-7589_102-531538/how-to-set-up-dual-network-adapters/%20Internet%20is%20only%20available%20via%20an%20ATT-%20MiFi%20hot%20spot.> Nov. 14, 2013, Jun. 27, 2011, 3 Pages.
Jones, "Automatic Summarising: The state of the Art", In Journal of Information Processing and Management: an International Journal, vol. 43, Issue 6, Nov. 1, 2007, 52 pages.
Karpinski, "Multi-GPU Parallel Memetic Algorithm for Capacitated Vehicle Routing Problem", Lecture Noes in Computer Science, May 8, 2014, 12 pages.
Kaszkiel, "Effective Ranking with Arbitrary Passages", In Journal of the American Society for Information Science and Technology, vol. 52, Issue 4, Feb. 15, 2001, 21 pages.
Kaszkiel, "Efficient Passage Ranking for Document Databases", In Journal of ACM Transactions on Information Systems, Oct. 1, 1999, 26 pages.
Keller, "MicroCast: Cooperative Video Streaming on Smartphones", In Proceedings: The 10th International Conference on Mobile Systems, Applications, and Services, Jun. 25, 2012, 13 pages.
Keshtkar, "A Corpus-based Method for Extracting Paraphrases of Emotion Terms", Proceedings of the NAACL HLT 2010 Workshop on Computational Approaches to Analysis and Generation of Emotion in Text, 2010, 10 pages.
Ko, "Cammia—A Context-Aware Spoken Dialog System for Mobile Environments", In Automatic Speech Recognition and Understanding, Jul. 29, 2011, 2 pages.
Kohler, "Fast Point-to-Point Shortest Path Computations with Arc-Flags", In Proceedingsof Shortest Path Computations: Ninth DIMACS Challenge, vol. 24 of DIMACS Book. American Mathematical Society, Nov. 13, 2006, pp. 1-27.
Kolarik, "Perceiving Auditory Distance Using Level and Direct-to-Reverberant Ratio Cues", In the Journal of the Acoustical Society of America, Oct. 2011, 4 pages.
Konig, "Nonlinear Discriminant Feature Extraction for Robust Text-Independent Speaker Recognition", In Proceeding of the RLA2C, ESCA workshop on Speaker Recognition and its Commercial and Forensic Applications, Apr. 1998, 4 pages.
Koo, "Autonomous Construction of a WiFi Access Point Map Using Multidimensional Scaling", In Proceedings of the 9th international conference on Pervasive computing, Jun. 12, 2011, 18 pages.
Krokstad, "The Hundred Years Cycle in Room Acoustic Research and Design", In Proceedings of Reflections on sound, Jun. 2008, 30 pages.
Kumar, "Describable Visual Attributes for Face Verification and Image Research", IEEE Transactions on Pattern Analysis and Machine Intelligence, Oct. 2011, 17 pages.
Kumar, "Gaze-Enhanced Scrolling Techniques", In Proceedings of the 20th Annual ACM Symposium on User Interface Software and Technology, Oct. 2007, 4 pages.
Kumar, "Face Recognition Using Gabor Wavelets", In Proceedings of the 40th IEEE Asilomar Conference on Signals, Systems and Computers, Oct. 2006, 5 pages.
Kumar, "Attribute and Simile Classifiers for Face Verification", In Proceedings of the 12th IEEE International Conference on Computer Vision (ICCV), Sep. 2009, 8 pages.
Kuttruff, "Room Acoustics, Fourth Edition", Available at: http://www.crcpress.com/product/isbn/9780419245803, Aug. 3, 2000, 1 page.
Laflen, "Introducing New Features in the VSTS Database Edition GDR", http://msdn.microsoft.com/en-us/magazine/dd483214.aspx, Nov. 2008, 16 pages.
Lanitis, "Toward Automatic Simulation of Aging Effects on Face Images", IEEE Trans. PAML, vol. 24, No. 4, Apr. 2002, 14 pages.
Lauther, "An Experimental Evaluation for Point-To-Point Shortest Path Calculation on Roadnetworks with Precalculated Edge-Flags", In Proceedings of the 9th DIMACS Implementation Challenge: The Shortest Path Problem, Nov. 2006, 18 pages.
Lavrenko, "Relevance-Based Language Models", In Proceedings of the 24th Annual International ACM SIGIR Conference on Research and Development in Information Retrieval, Sep. 9, 2001, 8 pages.
Lecouteux, "Dynamic Combination of Automatic Speech Recognition Systems by Driven Decoding", In Journal of IEEE Transactions on Audio, Speech and Language Processing, Jan. 2013, 10 pages.
Lee, "Intention-Based Corrective Feedback Generation using Context-Aware Model", In Proceedings of the Second International Conference on Computer Supported Education, Apr. 7, 2010, 8 pages.
Lei, "Face Recognition by Exploring Information Jointly in Space, Scale and Orientation", IEEE Transactions on Image Processing, Jan. 2011, pp. 247-256.
Li, "Probabilistic Models for Inference about Identity", IEEE Transactions on Pattern Recognition and Machine Intelligence, Jan. 2012, 16 pages.
Li, "Comparison of Discriminative Input and Output Transformations for Speaker Adaptation in the Hybrid NN/ HMM Systems", In Proceedings of 11th Annual Conference of the International Speech Communication Association, Sep. 26, 2010, 4 pages.

(56) References Cited

OTHER PUBLICATIONS

Li, "Lattice Combination for Improved Speech Recognition", In Proceedings of the 7th International Conference of Spoken Language Processing, Sep. 16, 2002, 4 pages.

Li, "Spatial Sound Rendering Using Measured Room Impulse Responses", In IEEE International Symposium on Signal Processing and Information Technology, Aug. 27, 2006, 5 pages.

Li, "Bayesian Face Recognition Using Support Vector Machine and Face Clustering", In Proceedings of the IEEE Computer Society on Computer Vision Pattern and Recognition (CVPR), Jun. 2004, 7 pages.

Li "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

Liang, "Face Alignment via Component-Based Discriminative Search", Computer Vision, ECCV 2008, Lecture Notes in Computer Science vol. 5303, 2008, 14 pages.

Liao, "Speaker Adaptation of Context Dependent Deep Neural Networks", In IEEE International Conference on Acoustics, Speech and Signal Processing, May 26, 2013, 5 pages.

Lilly, "Robust Speech Recognition Using Singular Value Decomposition Based Speech Enhancement", IEEE TENCON, 1997, 4 pages.

Lin, "What Makes a Good Answer? The Role of Context in Question Answering", In Proceedings of the Ninth IFIP TC13 International Conference on Human-Computer Interaction, Sep. 2003, 8 pages.

Liu, "Use of Contexts in Language Model Interpolation and Adaptation", In Journal of Computer Speech and Language vol. 27 Issue 1, Feb. 2009, 23 pages.

Liu, "Language Model Combination and Adaptation using Weighted Finite State Transducers", In Proceedings of IEEE International Conference on Acoustics Speech and Signal Processing, Mar. 14, 2010, 4 pages.

Loizides, "The Myth of Find: User Behaviour and Attitudes Towards the Basic Search Feature", In Proceedings of the 8th ACM/IEEE-CS Joint Conference on Digital Libraries, Jun. 16, 2008, 4 pages.

Lu, "Context Aware Textures", In Journal of ACM Transactions on Graphics, vol. 26 Issue 1, Jan. 2007, 31 pages.

Luo, "UCAN: A Unified Cellular and AdHoc Network Architecture", In Proceedings: Ninth Annual International Conference on Mobile Computing and Networking, Sep. 14, 2013, 15 pages.

Lv, "A Comparative Study of Methods for Estimating Query Language Models with Pseudo Feedback", In Proceedings of the 18th ACM Conference on Information and Knowledge Management, Nov. 2, 2009, 4 pages.

Lv, "Positional Language Models for Information Retrieval", In Proceedings of the 32nd International ACM SIGIR Conference on Research and Development in Information Retrieval, Jul. 19, 2009, 8 pages.

Machiraju, "Designing Multitenant Applications on Windows Azure", Available at: http://msdn.microsoft.com/en-us/library/windowsazure/hh689716.aspx, Apr. 18, 2013, 20 pages.

Madduri, "Parallel Shortest Path Algorithms for Solving Large-Scale Instances", In Proceedings of 9th DIMACS Implementation Challenge—The Shortest Path Problem, Aug. 30, 2006, 39 pages.

Malony, "Compensation of Measurement Overhead in Parallel Performance Profiling", The International Journal of High Performance Computing Applications, May 1, 2007, 23 pages.

Manetti, "Next Generation CDN services for Community Networks", In Proceedings: The Third International Conference on Next Generation Mobile Applications, Services and Technologies, Sep. 15, 2009, pp. 89-94.

Martin, "CUDA Solutions for the SSSP Problem", In Proceedings of 9th International Conference Baton Rouge, May 25, 2009, 10 pages.

Mavridis, "Friends with Faces: How Social Networks Can Enhance Face Recognition and Vice Versa", In Proceedings of Computational Social Networks Analysis: Trends, Tools and Research Advances, May 24, 2010, 30 pages.

Mehra, "Wave-Based Sound Propagation in Large Open Scenes Using an Equivalent Source Formulation", In Journal of ACM transactions on Graphics, vol. 32, Issue 2, Apr. 1, 2013, 13 pages.

Mehra, "An efficient GPU-based time domain solver for the acoustic wave equation", In Proceedings of Applied Acoustics, vol. 73, Issue 2, Feb. 2012, 13 pages.

Mehrotra, "nterpolation of Combined Head and Room Impulse Response for Audio Spatialization", In Proceeding of IEEE 13th International Workshop on Multimedia Signal Processing, Oct. 17, 2011, 6 pages.

Meinedo, "Combination of Acoustic Models in Continuous Speech Recognition Hybrid Systems", In Proceedings of Sixth International Conference on Spoken Language Processing, Oct. 2000, 4 pages.

Menezes, "Session-based Device Configuration", U.S. Appl. No. 14/257,502, filed Apr. 21, 2014, 67 pages.

Meyer, "D-Stepping: A Parallelizable Shortest Path Algorithm", In Journal of Algorithms, vol. 49, Issue 1, Oct. 2003, pp. 114-152.

Mihalcea, "Wikify!: Linking Documents to Encyclopedic Knowledge", In Proceedings of the Sixteenth ACM Conference on Conference on Information and Knowledge Management,, Nov. 6, 2007, 9 Pages.

Militano, "Group Interactions in Wireless Cooperative Networks", In Proceedings: IEEE 73rd Conference on Vehicular Technology, May 15, 2011, 5 Pages.

Moghaddam, "Bayesian Face Recognition", The Journal of Pattern Recognition, Nov. 2000, pp. 1771-1782.

Mohamed, "Acoustic Modeling Using Deep Belief Networks", In IEEE Transactions on Audio, Speech, and Language Processing, vol. 20, Issue 1, Jan. 2012, 10 pages.

Moreira, "Towards the Rapid Development of a Natural Language Understanding Module", In Proceedings of the 10th International Conference on Intelligent Virtual Agents, Jan. 2011, 7 pages.

Motlicek, "Feature and Score Level Combination of Subspace Gaussinasin LVCSR Task", In IEEE International Conference on Acoustics, Speech and Signal Processing, May 26, 2013, 5 pages.

Na, "A 2-Poisson Model for Probabilistic Coreference of Named Entities for Improved Text Retrieval", In Proceedings of the 32nd International ACM SIGIR Conference on Research and Development in Information Retrieval, Jul. 19, 2009, 8 pages.

Neve, "Face Recognition for Personal Photos using Online Social Network Context and Collaboration", In Guest Lecture at KAIST, Dec. 14, 2010, 54 pages.

Nguyen, "Cosine Similarity Metric Learning for Face Verification", In Proceedings of the 10th Asian Conference on Computer Vision (ACCV), Nov. 2010, 12 pages.

Novak, "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.

Ojala, "A Generalized Local Binary Pattern Operator for Multiresolution Gray Scale and Rotation Invariant Texture Classification", In Proceedings of the 2nd International Conference on Advances in Pattern Recognition (ICAPR), Mar. 2001, 10 pages.

Ortega-Arranz, "A New GPU-based Approach to the Shortest Path Problem", In Proceedings of International Conference on High Performance Computing and Simulation, Jul. 1, 2013, 7 pages.

Papadopoulos, "Image Clustering Through Community Detection on Hybrid Image Similarity Graphs", In 17th IEEE International Conference on Image Processing, Sep. 26, 2014, 4 pages.

Pascoal, "Implementations and Empirical Comparison of K Shortest Loopless Path Algorithms", In Proceedings of the 9th DIMACS Implementation Challenge: The Shortest Path Problem, Nov. 2006, 16 pages.

Peng, "Joint and Implicit Registration for Face Recognition", Proceedings of the IEEE Computer Society Conference on Computer Vision and Pattern Recognition (CVPR'09), Jun. 2009, 8 pages.

Perenson, "In-depth Look at Google+ Photo Update with the Team that Designed it", Available at: http://connect.dpreview.com/post/1400574775/hands-on-with-google-plus-photo-update, May 17, 2013, 10 pages.

(56) References Cited

OTHER PUBLICATIONS

Perumalla, "GPU-based Real-Time Execution of Vehicular Mobility Models in Large-Scale Road Network Scenarios", In ACM/IEEE/SCS 23rd Workshop on Principles of Advanced and Distributed Simulation, Jun. 22, 2009, 9 pages.

Peter, "Frequency-domain edge diffraction for finite and infinite edges", In Proceedings of Acta acustica united with acustica, vol. 95, No. 3, May 6, 2014, 2 pages.

Petkova, "Proximity-Based Document Representation for Named Entity Retrieval", In Proceedings of the Sixteenth ACM Conference on Conference on Information and Knowledge Management, Nov. 6, 2007, 10 pages.

Phillips, "The FERET Evaluation Methodology for Face-Recognition Algorithms", IEEE Transactions on Pattern Analysis and Machine Intelligence, Oct. 2000, pp. 1090-1104.

Pierce, "An Introduction to Its Physical Principles and Applications", In Acoustical Society of America, Jun. 1989, 1 page.

Ponte, "A Language Modelling Approach to Information Retrieval", In Proceedings of the 21st Annual International ACM SIGIR Conference on Research and Development in Information Retrieval, Aug. 1, 1998, 7 pages.

Poulos, "Assisted Viewing of Web-based Resources", U.S. Appl. No. 14/161,693, filed Jan. 23, 2014, 48 pages.

Powell, "Increased Accuracy Corner Cube Arrays for High Resolution Retro-Reflective Imaging Applications", U.S. Appl. No. 62/062,732, filed Oct. 10, 2014, 46 pages.

Raghuvanshi, "Parametric Wave Field Coding for Precomputed Sound Propagation", Jul. 2014, 11 pages.

Raghuvanshi, "Interactive Physically-based Sound Simulation", In UMI Dissertation, Sep. 9, 2011, 187 Pages.

Raghuvanshi, "Precomputed wave simulation for real-time sound propagation of dynamic sources in complex scenes", In Journal of ACM Transactions on Graphics, vol. 29, Issue 4, Jul. 26, 2010, 11 pages.

Raghuvanshi, "Efficient and Accurate Sound Propagation Using Adaptive Rectangular Decomposition", In IEEE Transactions on Visualization and Computer Graphics, vol. 15, Issue 99, Feb. 13, 2009, 13 pages.

Ramanan, "Local Distance Functions: A Taxonomy, New Algorithms, and an Evaluation", IEEE Transactions on Pattern Analysis and Machine Intelligence, Apr. 2011, 8 pages.

Rindel, "The Use of Colors, Animations and Auralizations in Room Acoustics", In Internoise, Sep. 15, 2013, 9 Pages.

Roberts, "Evaluating Passage Retrieval Approaches for Question Answering", In Proceedings of 26th European Conference on Information Retrieval, Apr. 14, 2003, 8 pages.

Robertson, "Okapi at TREC-3", In Proceedings of Text Retrieval Conference, Jan. 24, 2014, 19 pages.

Rodrig, "Command User Interface for Displaying and Scaling Selectable Controls and Commands", U.S. Appl. No. 14/254,681, filed Apr. 16, 2014, 51 pages.

Rosten, "Real-time Video Annotations for Augmented Reality", Advances in Visual Computing Lecture Notes in Computer Science, Jan. 1, 2005, 8 pages.

Rouillard, "Contextual QR Codes", In Proceedings of the Third International Multi-Conference on Computing in the Global Information Technology, Jul. 27, 2008, 6 pages.

Sabine, "Room acoustics", In Transactions of the IRE Professional Group on Audio, vol. 1, Issue 4, Jul. 1953, 9 pages.

Sainath, "Auto-Encoder Bottleneck Features Using Deep Belief Networks", In Proceedings of IEEE International Conference on Acoustics, Speech and Signal Processing, Mar. 25, 2012, 4 pages.

Sainath, "Low-Rank Matrix Factorization for Deep Neural Network Training with High-Dimensional Output Targets", In proceedings of IEEE International Conference on Acoustics, Speech and Signal Processing, May 26, 2013, 5 pages.

Sainath, "Making Deep Belief Networks Effective for Large Vocabulary Continuous Speech Recognition", In Proceedings of IEEE Workshop on Automatic Speech Recognition and Understanding, Dec. 11, 2011, 6 pages.

Sakamoto, "Calculation of impulse responses and acoustic parameters in a hall by the finite-difference time-domain method", In Proceedings of Acoustical Science and Technology, vol. 29, Issue 4, Feb. 2008, 10 pages.

Saluja, "Context-aware Language Modeling for Conversational Speech Translation", In Proceedings of Machine Translation Summit XIII, Sep. 19, 2011, 8 pages.

Sanders, "Robust, Almost Constant Time Shortest-Path Queries in Road Networks", In Proceedings of the 9th DIMACS Implementation Challenge: The Shortest Path Problem, Nov. 2006, 19 pages.

Santos, "K Shortest Path Algorithms", In Proceedings of the 9th DIMACS Implementation Challenge: The Shortest Path Problem, Nov. 2006, 13 pages.

Sarukkai, "Word Set Probability Boosting for Improved Spontaneous Dialog Recognition", IEEE Transactions on Speech and Audio Processing, vol. 5, No. 5, Sep. 1997, 13 pages.

Sarukkai, "Improved Spontaneous Dialogue Recognition Using Dialogue and Utterance Triggers by Adaptive Probability Boosting", In Fourth International Conference on Spoken Language, vol. 1, Oct. 3, 1996, 4 pages.

Sato, "Incentive Mechanism Considering Variety of User Cost in P2P Content Sharing", In Proceeding: The IEEE Global Telecommunications Conference, Communications and Computer Engineering, Graduate School of Informatics, Kyoto University Yoshidahonnmachi, Sakyo-ku, Kyoto, 606-8501 Japan, Nov. 30, 2008, 5 Pages.

Satoh, "Poster Abstract: Ambient Sound-based Proximity Detection with Smartphones", In Proceedings of the 11th ACM Conference on Embedded Networked Sensor Systems, Nov. 11, 2013, 2 pages.

Savioja, "Real-Time 3D Finite-Difference Time-Domain Simulation of Mid-Frequency Room Acoustics", In Proceedings of the 13th International Conference on Digital Audio Effects, Sep. 6, 2010, 8 pages.

Savioja, "Simulation of room acoustics with a 3-D finite difference mesh", In Proceedings of the International Computer Music Conference, Sep. 1994, 4 pages.

Sbai, "P2P Content Sharing in Spontaneous Multi-Hop Wireless Networks", In Proceedings: Second International Conference of Communication Systems and Networks, Jan. 5, 2010, 10 Pages.

Scarr, "Improving Command Selection with Command Maps", In Proceedings of the SIGCHI Conference on Human Factors in Computing Systems, May 2012, 10 pages.

Seide, "Conversational Speech Transcription using Context-Dependent Deep Neural Networks", In Proceeding of 12th Annual Conference of the International Speech Communication Association, Aug. 28, 2011, 4 pages.

Seneff, "Galaxy-II: A Reference Architecture for Conversational System Development", In Proceedings of the 5th International Conference on Spoken Language Processing, Nov. 2008, 4 pages.

Seo, "Face Verification Using the Lark Representation", IEEE Transactions on Information Forensics and Security, Dec. 2011, 12 pages.

Shah, "All Smiles: Automatic Photo Enhancement by Facial Expression Analysis", In Proceedings of Conference on Visual Media Production, Dec. 5, 2012, 10 pages.

Shan, "Image Based Surface Detail Transfer", in IEEE Computer Graphics and Applications, vol. 24 Issue 3, May 2004, 6 pages.

Shanklin, "Samsung Galaxy S4 to Feature Eye-Tracking Technology", Available at: http://www.gizmag.com/galaxy-s4-eye-tracking-technology/26503/, Mar. 4, 2013, 5 pages.

Shen, "Agent-based Traffic Simulation and Traffic Signal Timing Optimization with GPU", 2011 14th International IEEE Conference on Intelligent Transportation Systems, Oct. 5, 2011, pp. 145-150.

Shieh, "Seawall: Performance Isolation for Cloud Datacenter Networks", In Proceedings of the 2nd UNENIX Conference on Hot Topics in Cloud Computing, Jun. 22, 2010, 7 pages.

Sing, "Domain Metric Knowledge Model for Embodied Conversation Agents", In 5th International Conference on Research, Innovation & Vision for the Future, Mar. 5, 2007, 7 pages.

Singhal, "Pivoted Document Length Normalization", In Proceedings of the 19th Annual International ACM SIGIR Conference on Research and Development in Information Retrieval, Aug. 18, 1996, 12 pages.

(56) References Cited

OTHER PUBLICATIONS

Singh-Miller, "Dimensionality Reduction for Speech Recognition Using Neighborhood Components Analysis", In Proceedings of 8th Annual Conference of the International Speech Communication Association, Antwerp, Dec. 27, 2007, 4 pages.
Siniscalchi, "Hermitian Based Hidden Activation Functions for Adaptation of Hybrid HMM/ANN Models", In Proceedings of 13th Annual Conference of the International Speech Communication Association,, Sep. 9, 2012, 4 pages.
So, "Routing and Channel Assignment in Multi-Channel Multi-Hop Wireless Networks with Single-NIC Devices", In Proceeding: The Technical Report, Department of Computer Science, Department of Electrical and Computer Engineering, Coordinated Science Laboratory, University of Illinois at Urbana-Champaign, Dec. 2004, 12 Pages.
Sommer, "Shortest-Path Queries in Static Networks", In Proceedingsof ACM Computing Surveys, Apr. 7, 2014, 35 pages.
Song, "Optimal Resource Utilization in Content Distribution Networks", In Proceedings: Technical Report of Computer Science, Dept. of Computer Science, Cornell University, Ithaca, NY 14853, Nov. 14, 2005, 14 Pages.
Song, "Centralized Control of Wireless Sensor Networks for Real-Time Applications", Retrieved from the Internet: URL:http://citeseerx.ist.psu.edu/viewdoc/download?doi=I0.1.1.187.8761&rep=rep1&type=pdf, Retrieved on Jul. 9, 2015, Nov. 7, 2007, 8 Pages.
Starr, "Facial recognition app matches strangers to online profiles", Available at: http://www.cnet.com.au/facial-recognition-app-matches-strangers-to-online-profiles-339346355.htm, Jan. 7, 2014, 10 pages.
Stettner, "Computer Graphics Visualization for Acoustic Simulation", In Proceedings of the 16th annual conference on Computer graphics and interactive techniques, vol. 23, No. 3, Jul. 1989, 12 pages.
Su, "Error Back Propagation for Sequence Training of Context-Dependent Deep Networks for Conversational Speech Transcription", In IEEE International Conference on Acoustics, Speech, and Signal Processing, May 26, 2013, 5 pages.
Susskind, "Modeling the joint density of two images under a variety of transformations", In Proceedings of the IEEE Computer Society Conference on Computer Vision and Pattern Recognition (CVPR), Jun. 2011, 8 pages.
Svensson, "The use of Ambisonics in describing room impulse responses", In Proceedings of the International Congress on Acoustics, Apr. 2004, 4 pages.
Swietojanski, "Revisiting Hybrid and GMM-HMM System Combination Techniques", In Proceeding of the IEEE International Conference on Acoustics, Speech and Signal Processing, May 26, 2013, 5 pages.
Taigman, "Multiple One-Shots for Utilizing Class Label Information", In Proceedings of the British Machine Vision Conference (BMVC), Sep. 2009, 12 pages.
Taigman, "Leveraging Billions of Faces to Overcome Performance Barriers in Unconstrained Face Recognition", Aug. 4, 2011, 7 pages.
Takala, "Sound rendering", In Proceedings of Siggraph Computer Graphics, Jul. 1992, 11 pages.
Taylor, "RESound: interactive sound rendering for dynamic virtual environments", In Proceedings of the 17th ACM international conference on Multimedia, Oct. 19, 2009, 10 pages.
Tellex, "Quantitative Evaluation of Passage Retrieval Algorithms for Question Answering", In Proceedings of the 26th Annual International ACM SIGIR Conference on Research and Development in Information Retrieval, Jul. 28, 2003, 7 pages.
Thompson, "A review of finite-element methods for time-harmonic acoustics", In Journal of Acoustical Society of America, vol. 119, Issue 3, Mar. 2006, 16 pages.
Thouin, "Video-on-Demand Networks: Design Approaches and Future Challenges", In Proceeding: The IEEE Network, vol. 21, Issue 2, Mar. 2007, pp. 42-48.
Tian, "Facial Expression Analysis", Handbook of Face Recognition, pp. 247-275.
Tombros, "Advantages of Query Biased Summaries in Information Retrieval", In Proceedings of the 21st Annual International ACM SIGIR Conference on Research and Development in Information Retrieval, Aug. 1, 1998, 9 Pages.
Trmal, "Adaptation of a Feedforward Artificial Neural Network Using a Linear Transform", In Proceedings of in Text, Speech and Dialogue, Sep. 10, 2010, 8 pages.
Tsay, "Personal Photo Organizer based on Automated Annotation Framework", In 5th International Conference on Intelligent Information Hiding and Multimedia Signal Processing, Sep. 12, 2009, 4 pages.
Tysowski, "Peer to Peer Content Sharing on Ad Hoc Networks of Smartphones", In Proceedings: 7th International Conference of Wireless Communications and Mobile Computing, Jul. 4, 2011, pp. 1445-1450.
Valimaki, "Fifty Years of Artificial Reverberation. Audio, Speech, and Language Processing", In IEEE Transactions on Audio, Speech, and Language Processing, vol. 20, Issue 5, Jul. 2012, 28 pages.
van "Transform Coding of Audio Impulse Responses", In Master's Thesis of Delft University of Technology, Aug. 2003, 109 pages.
Van "Unified Communication and Collaboration from the User's Perspective", retrieved from: http://www.ucstrategies.com/unified-communications-expert-views/unified-communication-and-collaboration-from-the-users-perspective.aspx on Dec. 8, 2009, 2 pages.
VanHoucke, "Improving the Speed of Neural Networks on CPUs", In Proceedings of NIPS Workshop on Deep Learning and Unsupervised Feature Learning, Dec. 16, 2011, 8 pages.
Wang, "Bayesian Face Recognition Using Gabor Features", In Proceedings of the ACM SIGMM Workshop on Biometrics Methods and Applications (WBMA), Nov. 8, 2003, pp. 70-73.
Wang, "Subspace Analysis Using Random Mixture Models", In Proceedings of the IEEE Computer Society Conference on Computer Vision and Pattern Recognition (CVPR), Jun. 2005, 7 pages.
Wang, "Boosted Multi-Task Learning for Face Verification with Applications to Web Image and Video Search", In Proceedings of the IEEE Conference on Computer Vision and Pattern Recognition, Jun. 2009, 8 pages.
Wang, "A Unified Framework for Subspace Face Recognition", retrieved at <<http://ieeexplore.ieee.org/Xplore/login.jsp?url=http%3A%2F%2Fieeexplore.ieee.org%2Fiel5%2F34%2F29188%2F01316855.pdf&authDecision=-203>>, Sep. 2004, pp. 1222-1228.
Weinberger, "Distance Metric Learning for Large Margin Nearest Neighbor Classification", In Proceedings of the Conference on Advances in Neural Information Processing Systems (NIPS), Dec. 2008, 8 pages.
Wodecki, "Multi-GPU Parallel Memetic Algorithm for Capacitated Vehicle Routing Problem", In Proceedings of Distributed, Parallel, and Cluster Computing, Jan. 21, 2014, pp. 207-214.
Wu, "Adapting Boosting for Information Retrieval Measures", In Journal of Information Retrieval, vol. 13, Issue 3, Jun. 1, 2010, 17 pages.
Xu, "User-Oriented Document Summarization through Vision-Based Eye-Tracking", In Proceedings of the 14th International Conference on Intelligent User Interfaces, Feb. 8, 2009, 10 pages.
Xue, "Restructuring Deep Neural Network Acoustic Models", U.S. Appl. No. 13/920,323, filed Jun. 18, 2013, 30 pages.
Xue, "Singular Value Decomposition Based Low-Footprint Speaker Adaptation and Personalization for Deep Neural Network", In Proceedings of the IEEE International Conference on Acoustics, Speech and Signal Processing, May 4, 2014, 5 pages.
Xue, "Restructuring of Deep Neural Network Acoustic Models with Singular Value Decomposition", In Proceedings of 14th Annual Conference of the International Speech Communication Association Aug. 25, 2013, 5 pages.
Yan, "A Scalable Approach to Using DSS-Derived Features in GMM-HMM Based Acoustic Modeling for LVCSR", In Proceeding of the 14th Annual Conference of the International Speech Communication Association, Aug. 25, 2013, 5 pages.

(56) References Cited

OTHER PUBLICATIONS

Yang, "Qualifier in TREC-12 QA Main Task", In Proceedings of the Twelfth Text Retrieval Conference, Nov. 2003, 9 Pages.
Yao, "Adaptation of Context-Dependent Deep Neural Networks for Automatic Speech Recognition", In IEEE Spoken Language Technology Workshop, Dec. 2, 2012, 4 pages.
Yeh, "Wave-ray Coupling for Interactive Sound Propagation in Large Complex Scenes", In Journal of ACM Transactions on Graphics, vol. 32 Issue 6, Nov. 2013, 10 pages.
Yin, "An Associate-Predict Model for Face Recognition", Proceedings of the IEEE Conference on Computer Vision and Pattern Recognition, Jun. 2011, 8 pages.
Ying, "Distance Metric Learning with Eigenvalue Optimization", Journal of Machine Learning Research, Jan. 3, 2012, 26 pages.
Yu, "Improved Bottleneck Features Using Pretrained Deep Neural Networks", In Proceedings of 12th Annual Conference of the International Speech Communication Association, Aug. 28, 2011, 4 pages.
Yu, "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, "KL-Divergence Regularized Deep Neural Network Adaptation for Improved Large Vocabulary Speech Recognition", In IEEE International Conference on Acoustics, Speech and Signal Processing, May 26, 2013, 5 pages.
Zhai, "A Study of Smoothing Methods for Language Models Applied to Ad Hoc Information Retrieval", In Proceedings of the 24th Annual International ACM SIGIR Conference on Research and Development in Information Retrieval, Sep. 9, 2009, 9 Pages.
Zhang, "Two-Dimensional Bayesian Subspace Analysis for Face Recognition", In Proceedings of the 4th International Symposium on Neutral Networks (ISNN), Jun. 2007, 7 pages.
Zhu, "A Rank-Order Distance based Clustering Algorithm for Face Tagging", In Proceedings of the IEEE Conference on Computer Vision and Pattern Recognition (CVPR), Jun. 2011, pp. 481-488.
Zwol, "Prediction of Favourite Photos using Social, Visual, and Textual Signals", In Proceedings of the International Conference on Multimedia, Oct. 25, 2010, 4 pages.
Corrected Notice of Allowance, U.S. Appl. No. 14/275,806, May 5, 2016, 2 pages.
Corrected Notice of Allowance, U.S. Appl. No. 14/275,806, Jun. 2, 2016, 2 pages.
Final Office Action, U.S. Appl. No. 14/266,795, Apr. 11, 2016, 12 pages.
Final Office Action, U.S. Appl. No. 14/279,146, Apr. 13, 2016, 16 pages.
Final Office Action, U.S. Appl. No. 14/312,501, May 27, 2016, 13 pages.
International Preliminary Report on Patentability, Application No. PCT/US2015/027688, Apr. 26, 2016, 7 pages.
International Preliminary Report on Patentability, Application No. PCT/US2015/022887, Apr. 7, 2016, 8 pages.
International Preliminary Report on Patentability, Application No. PCT/US2015/030104, Apr. 15, 2016, 8 pages.
International Preliminary Report on Patentability, Application No. PCT/US2015/030153, Apr. 15, 2016, 8 pages.
International Search Report and Written Opinion, Application No. PCT/US2015/035218, May 19, 2016, 19 pages.
Invitation to Pay Additional Fees/Partial International Search Report, Application No. PCT/US2015/033950, Feb. 23, 2016, 6 pages.
Non-Final Office Action, U.S. Appl. No. 14/264,619, Apr. 19, 2016, 11 pages.
Non-Final Office Action, U.S. Appl. No. 14/268,953, Apr. 19, 2016, 14 pages.
Non-Final Office Action, U.S. Appl. No. 14/465,679, May 10, 2016, 31 pages.
Non-Final Office Action, U.S. Appl. No. 147/264,619, Apr. 19, 2016, 11 pages.
Notice of Allowance, U.S. Appl. No. 14/275,724, May 9, 2016, 5 pages.
Notice of Allowance, U.S. Appl. No. 14/311,208, Mar. 30, 2016, 8 pages.
Second Written Opinion, Application No. PCT/US2015/026971, Mar. 30, 2016, 7 pages.
Second Written Opinion, Application No. PCT/US2015/027409, Mar. 18, 2016, 8 pages.
Second Written Opinion, Application No. PCT/US2015/027689, Apr. 1, 2016, 8 pages.
Second Written Opinion, Application No. PCT/US2015/028383, Apr. 18, 2016, 9 pages.
Second Written Opinion, Application No. PCT/US2015/029334, Mar. 31, 2016, 5 pages.
Second Written Opinion, Application No. PCT/US2015/029805, May 6, 2016, 9 pages.
Second Written Opinion, Application No. PCT/US2015/030096, Apr. 5, 2016, 6 Pages.
Second Written Opinion, Application No. PCT/US2015/030113, Mar. 21, 2016, 8 pages.
Second Written Opinion, Application No. PCT/US2015/031270, May 3, 2016, 9 pages.
Second Written Opinion, Application No. PCT/US2015/032089, Apr. 12, 2016, 8 pages.
Second Written Opinion, Application No. PCT/US2015/033872, Apr. 21, 2016, 6 pages.
Second Written Opinion, Application No. PCT/US2015/036587, May 18, 2016, 7 pages.
Second Written Opinion, Application No. PCT/US2015/036859, May 6, 2016, 7 pages.
Supplemental Notice of Allowance, U.S. Appl. No. 14/275,724, May 26, 2016, 2 pages.
Supplemental Notice of Allowance, U.S. Appl. No. 14/275,761, May 12, 2016, 2 pages.
Supplemental Notice of Allowance, U.S. Appl. No. 14/275,761, Jun. 8, 2016, 2 pages.
Supplemental Notice of Allowance, U.S. Appl. No. 14/304,174, Apr. 26, 2016, 4 pages.
Supplemental Notice of Allowance, U.S. Appl. No. 14/312,562, Apr. 28, 2016, 2 pages.
Final Office Action, U.S. Appl. No. 14/264,619, Aug. 12, 2016, 12 pages.
International Preliminary Report on Patentability, Application No. PCT/US2015/028383, Jul. 18, 2016, 10 pages.
International Preliminary Report on Patentability, Application No. PCT/US2015/030113, Jul. 14, 2016, 11 Pages.
International Preliminary Report on Patentability, Application No. PCT/US2015/029805, Jul. 27, 2016, 11 pages.
International Preliminary Report on Patentability, Application No. PCT/US2015/033872, Jul. 1, 2016, 6 pages.
International Preliminary Report on Patentability, Application No. PCT/US2015/030096, Jul. 14, 2016, 8 pages.
International Preliminary Report on Patentability, Application No. PCT/US2015/029334, Jul. 18, 2016, 8 pages.
International Preliminary Report on Patentability, Application No. PCT/US2015/026971, Aug. 10, 2016, 8 pages.
International Preliminary Report on Patentability, Application No. PCT/US2015/027409, Jun. 16, 2016, 9 pages.
International Preliminary Report on Patentability, Application No. PCT/US2015/035219, Jun. 23, 2016, 9 pages.
International Preliminary Report on Patentability, Application No. PCT/US2015/032089, Jun. 29, 2016, 9 pages.
International Preliminary Report on Patentability, Application No. PCT/US2015/027689, Jul. 18, 2016, 9 pages.
International Search Report and Written Opinion, Application No. PCT/US2015/021921, Jul. 17, 2015, 11 pages.
Non-Final Office Action, U.S. Appl. No. 14/264,012, Aug. 10, 2016, 8 pages.
Non-Final Office Action, U.S. Appl. No. 14/266,795, Jul. 19, 2016, 12 pages.
Non-Final Office Action, U.S. Appl. No. 14/279,146, Aug. 3, 2016, 15 pages.

(56) References Cited

OTHER PUBLICATIONS

Non-Final Office Action, U.S. Appl. No. 14/296,644, Aug. 4, 2016, 25 pages.
Non-Final Office Action, U.S. Appl. No. 14/316,802, Jul. 8, 2016, 17 pages.
Non-Final Office Action, U.S. Appl. No. 14/338,078, Jun. 16, 2016, 19 pages.
Non-Final Office Action, U.S. Appl. No. 14/529,636, Jul. 19, 2016, 12 pages.
Notice of Allowance, U.S. Appl. No. 12/573,157, Jun. 6, 2016, 10 pages.
Notice of Allowance, U.S. Appl. No. 14/304,911, May 23, 2016, 7 pages.
Notice of Allowance, U.S. Appl. No. 14/311,208, Jul. 19, 2016, 8 pages.
Second Written Opinion, Application No. PCT/US2015/035218, Jul. 27, 2016, 7 pages.
Second Written Opinion, Application No. PCT/US2015/036595, May 31, 2016, 6 pages.
Supplemental Notice of Allowance, U.S. Appl. No. 14/275,724, Jul. 6, 2016, 2 pages.
Supplemental Notice of Allowance, U.S. Appl. No. 14/275,724, Aug. 3, 2016, 2 pages.
Final Office Action, U.S. Appl. No. 14/281,518, Aug. 25, 2016, 29 pages.
Final Office Action, U.S. Appl. No. 14/456,679, Aug. 31, 2016, 33 pages.
First Action Interview Office Action, U.S. Appl. No. 14/444,987, Aug. 24, 2016, 9 pages.
Non-Final Office Action, U.S. Appl. No. 13/923,917, Jun. 30, 2016, 9 pages.
Non-Final Office Action, U.S. Appl. No. 14/275,785, Sep. 9, 2016, 14 pages.
Notice of Allowance, U.S. Appl. No. 14/227,492, Aug. 4, 2016, 11 pages.
Notice of Allowance, U.S. Appl. No. 14/265,110, Aug. 3, 2016, 22 pages.

\* cited by examiner

REVERSIBLE CONNECTOR FOR ACCESSORY DEVICES

RELATED APPLICATIONS

This application is a continuation of and claims priority to U.S. patent application Ser. No. 14/304,174, entitled "Reversible Connector for Accessory Devices," filed Jun. 13, 2014, the disclosure of which is contained herein in its entirety by reference.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Today, mobile computing devices such as laptops and tablets may be configured to support and connect to a variety of types of accessory devices by way of universal serial bus (USB) or other communication techniques. However, traditional connectors, ports, and connector cables for accessories are designed for connection in a single orientation. Accordingly, users may often attempt to make connections in the wrong way, which is not only frustrating for the user, but may also result in wear and/or damage to the connectors, ports, and connector cords.

Reversible connector techniques for accessory devices are described. In one or more implementations, a connector cable for an accessory of a host computing device is configured such that a head of the connector cable may be plugged into a corresponding port of the host in either orientation (straight or reverse). The host computing device is configured to sample signals associated with allocated pins of the connector to detect connection of the connector to an accessory port and to ascertain an orientation of the connector. A switching mechanism of the host computing device may then be configured to automatically route signals according to the orientation. In one approach, a pair of "detection" pins of the connector is dedicated for hot plug detection. A combination of high and low logic states that is conveyed via these two detection pins upon insertion of the connector may be used by a controller of the host to distinguish between different types of devices (e.g., two wire and one wire devices) and to resolve the orientation of the connector cable. Lines associated with the two detection pins may be sampled together (e.g., in parallel or in sequence) and values for obtained for the two line may be combined together to derive a combined logic state indicative of the device type and/or connector orientation. The controller may then operate to set-up signal routing according to the type of device and orientation. In order to do so, the controller may be configured to direct positions for switches and multiplexers of the host and/or the connected accessory to effectuate straight or reverse signal paths as appropriate.

In the following discussion, an example environment and devices are first described that may employ the techniques described herein. Example details and procedures are then described which may be performed in the example environment and by the devices as well as in other environments and by other devices. Consequently, implementation of the example details and procedures is not limited to the example environment/devices and the example environment/devices are not limited to the example details and procedures.

Example Operating Environment

Figure 1:
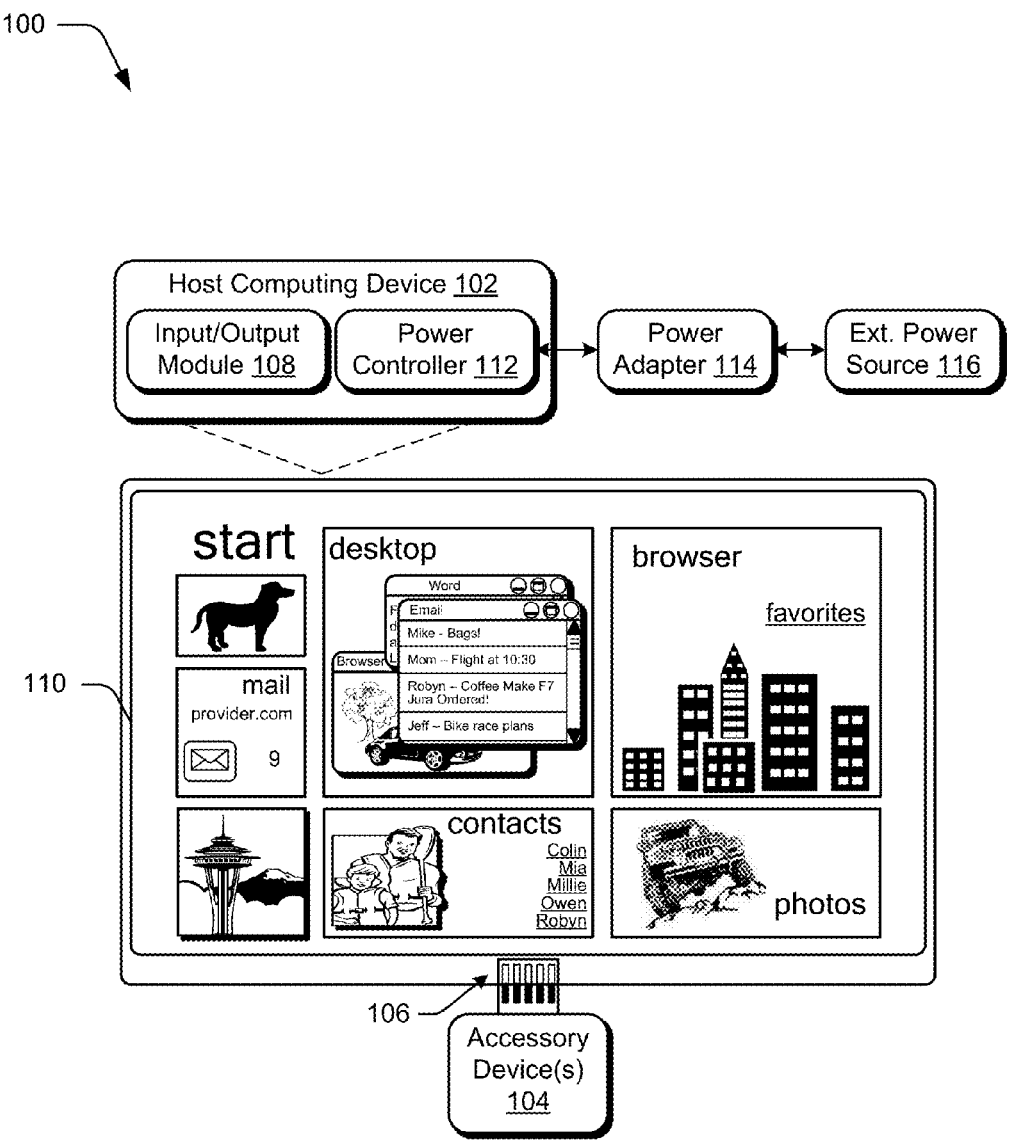
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a host computing device 102 that is physically and communicatively coupled to an accessory device 104 via an interface 106. The host computing device 102 may be configured in a variety of ways. For example, the computing device 102 may be configured for mobile use, such as a mobile phone, a tablet computer as illustrated, and so on. Thus, the host computing device 102 may range from full resource devices with substantial memory and processor resources to a low-resource device with limited memory and/or processing resources. The host computing device 102 may also relate to software that causes the host computing device 102 to perform one or more operations.

The host computing device 102, for instance, is illustrated as including an input/output module 108. The input/output module 108 is representative of functionality relating to processing of inputs and rendering outputs of the host computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

Various configurations for an accessory device 104 are also contemplated, such as a keyboard, game controller, configuration to mimic a musical instrument, a power adapter, a docking station, a USB hub, an external battery, combinations of these configurations, and so forth. Thus, the accessory device 104 may assume a variety of different configurations to support a variety of different functionality. Different accessory devices may be removably connected to the computing device at different times.

As previously described, the accessory device 104 is physically and communicatively coupled to the host computing device 102 in this example through an interface 106. Various types of interfaces 106 and connectors are also contemplated such as uses of a flexible hinge, magnetic coupling devices, integrated communication ports and communication contacts, mechanical coupling protrusions, slots, and/or indentions, individually or in combination to form different types of interfaces 106. In one example, the interface 106 may represent an accessory port (e.g., communication port) configured to enable connection to accessory devices via a corresponding connector and/or connector cord. In accordance with techniques discussed above and below, the accessory port and corresponding connector are designed to enable reversible connection of the connector to the port. In at least some implementations, the interface 106 is configured to enable communications for authentication and control of the accessory device 104 as described herein. For example, the computing device 102 may receive credentials (e.g., data indicative of an identity of an accessory), signals, and other data regarding capabilities of the accessory device through the interface responsive to detecting the presence/attachment of the accessory device 104. The interface may also provide a power coupling for exchange of power and communication of messages to implement and update power management and control functions as described above and below.

As further illustrated in FIG. 1 the computing device 102 may include a power controller 112 configured to implement aspects of power management contract techniques described herein. In particular, the power controller 112 represents functionality to perform various operations for power management including handling settings for power management based on accessory identities, facilitating exchange of control messages between the host and accessories, management of different power sources and switching between the sources, implementing a defined and/or selected power management scheme, managing battery life, and so forth. The power controller 112 may further facilitate connections and communications with a power adapter 114 (also referred to herein as a power supply unit (PSU)) configured to supply power to the device via a suitable external power source 116, such as a wall socket, external battery, power supply unit, or other of power source. The power controller 112 may also be operable to supply power to accessory devices in appropriate circumstances. In other words, the power controller 112 may manage power operations jointly for a host computing device and authorized accessory devices including power exchange between the host computing device and an accessory device.

The power controller 112 may be implemented in hardware, software, firmware and/or combinations thereof. By way of example and not limitation, the computing device 102 may include a microcontroller or other suitable hardware logic device configured to implement various functionally that is described herein in relation to power controller 112. The power controller 112 may therefore represent firmware or logic associated with a suitable hardware logic device. In addition or alternatively, the power controller 112 may be implemented by way of a processing system of the device and one or more program modules that are executable/operable via the processing system.

The power adapter 114 may be configured to selectively operate in multiple modes and supply multiple power levels to the computing device. The level of power supplied at a particular time may be based upon input, notifications, or other suitable feedback configured and sent to the power adapter 114 by the power controller 112 to cause the power adapter 114 to supply a corresponding level of power. Depending upon a power exchange state, the power adapter 114, when connected to the computing device, may charge a battery associated with one or both of the host and accessory, supply power to support operations of one or both the host and accessory, and otherwise supply power from external power sources 116 for joint charging and operation of the host and accessory in various combinations. A power scheme implemented via the power controller 112 may be configured to control flow of power between system components (e.g., host, accessory, and adapter) in dependence upon accessory identity, power exchange conditions, power source availability, and so forth. Further details regarding operation of the power controller 112 and the power adapter 114 to implement power management contracts for accessory devices can be found in the following discussion.

Figure 2:
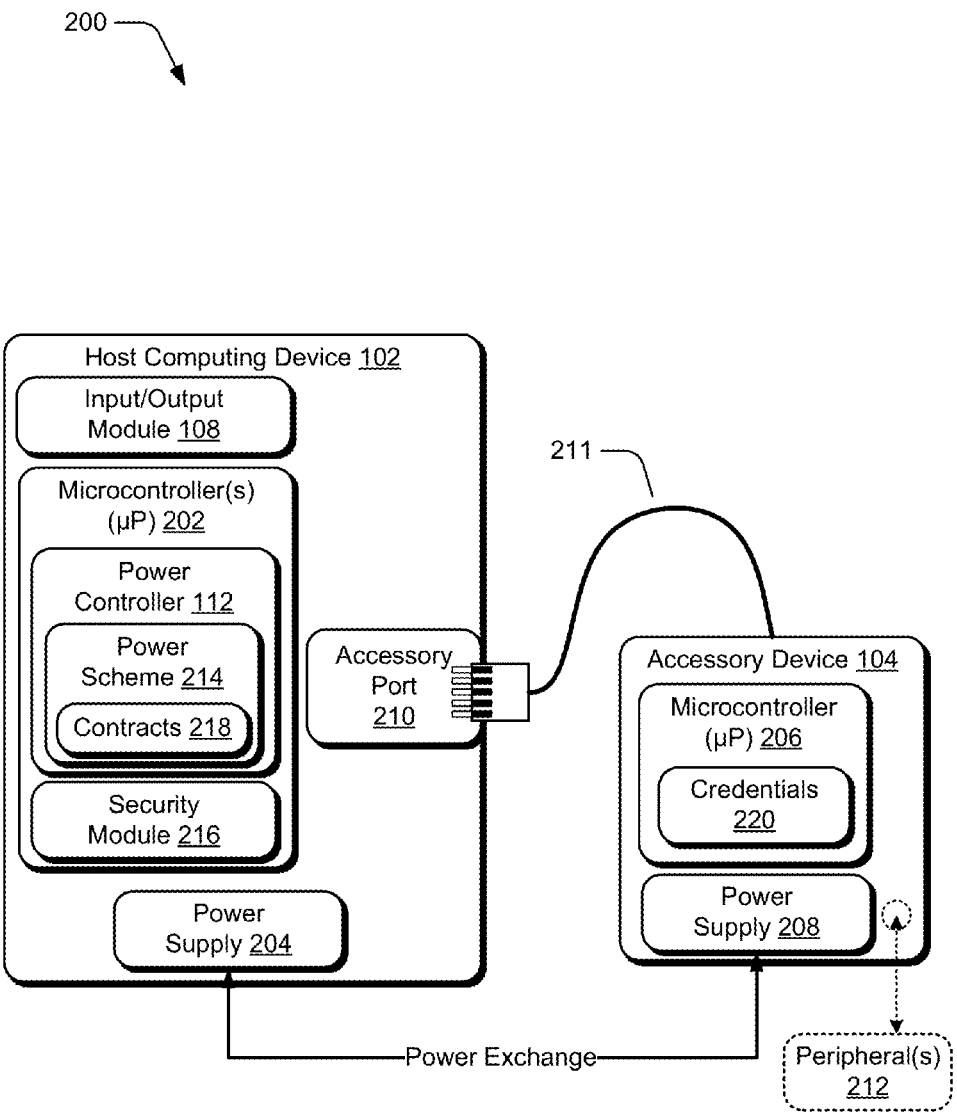
FIG. 2 depicts an example computing device and accessory device of FIG. 1 in greater detail.

FIG. 2 depicts generally at 200 an example host computing device 102 and accessory device 104 in greater detail. In FIG. 2, the host computing device 102 is depicted as having a power controller 112 is illustrated as being provided by one or more microcontroller(s) 202, also referred to as microprocessing unit(s) (μP). The computing device 104 further includes an associated power supply 204, such as one or more internal batteries. The accessory device 104 may also include one or more microcontroller(s) 206 and a respective power supply 208. The power supply 208 may be configured as one or more batteries that are internal to the accessory device 104 (e.g., an accessory battery) and may therefore be considered external batteries with respect to the host computing device 102.

The example microcontrollers (μPs) represent hardware devices/systems that are designed to perform a predefined set of designated tasks. Microcontrollers may represent respective on-chip systems/circuits having self-contained resources such as processing components, I/O devices/peripherals, various types of memory (ROM, RAM, Flash, EEPROM), programmable logic, and so forth. Different microcontrollers may be configured to implement embedded applications/functionality that are implemented at least partially in hardware and perform corresponding tasks. In particular, the example microcontrollers 202, 206 enable performance of tasks for device authentication and power management outside of operation of a general purpose processing system and other applications/components of the computing device or accessory device. Generally, power consumption of the microcontrollers is low in comparison with operating a general purpose processing system for a device.

Accordingly, components implemented via microcontrollers may operate using relatively low power, independently of operating a "primary" processing system of a host computing device, and/or without booting/executing an operating system or using other device components and applications. In other words, the microcontrollers may operate to perform some power management tasks in a low power mode without having to operate or supply power to the processing system and other device components (e.g., device memory, network interface, display device, etc.) and/or without completely starting-up or waking-up the computing device.

The host computing device 202 may be connectable to different accessory devices via an accessory port 210. The accessory port 210 is representative of functionality to achieve a physical and communicative coupling between the host computing device and various accessories. For example, a connector 211 corresponding to the accessory port 210 may be employed to connect accessories to the host computing and enable exchange of control signals, data, and power. In the depicted example, the connector 211 is illustrated as a connector cord that may be removably inserted into a corresponding port associated with the accessory interface 210, although other types of connections are also contemplated, such as the flexible hinge discussed in relation to FIG. 1, connections to a docking station discussed in relation to the following figure, and/or another suitable interfaces and connector combinations. In accordance with techniques described herein, the connector 211 and corresponding ports may be configured to support reversible connection/insertion of the connector/port combination.

As represented in FIG. 2, power exchange may occur between the power supply 204 of the host and the power supply 208 of the accessory in accordance with techniques described above and below. In some implementations, power exchange may also occur with an external power source 116 configured as an external battery via a power adapter 114 as represented in FIG. 1. In other words, three-way power exchange may occur between batteries/power supplies corresponding to the host, an accessory connected via the accessory interface, and an external power source. Generally, power exchange between the host and one or more connected devices (adapters/accessories/peripherals) may occur back and forth (e.g., bi-directionally) from the host to one or more of the devices, from one or more of the devices to the host, and/or directly between connected devices (e.g. device to device) through the host.

Thus, power exchange may occur via the accessory port 210 in some scenarios. Power supplied to the host computing device may be used to operate the host (e.g., service the system load) and/or to maintain a charge level of the power supply 204 (e.g., internal battery). Additionally, power supplied to the host may be supplied directly or indirectly to the accessory device 104 to support operations and/or charge the power supply 208 (e.g., external battery). Moreover, power may be distributed from the host computing device 102 and/or the accessory device 104 to one or more peripherals 212 that may be connected directly to the host computing device and/or connected to the system through the accessory device 104 as represented in FIG. 2. For example, in one or more implementations an accessory device may be configured to provide functionality of a peripheral device hub, such as a hub that provides multiple universal serial bus (USB) ports and/or other types of connection ports to which a variety of peripherals 212 may be connected. The peripherals 212 may include various devices, such as a peripheral display device, a printer, a scanner, audio devices, a camera, a storage device, or a network adapter, to name a few examples.

It should be noted that the host computing device 102 and accessory device 104 may both be configured to employ external power sources 116, such as through the use of respective power adapters 114 connected to a wall socket or another source. Power supplied directly to the accessory device 104 via a respective power adapter 114 may be used, shared, and/or exchanged between the host and accessory in a manner comparable to power that is supplied directly to the host computing device 102.

The host computing device may be further configured to implement a power scheme 214 and a security module 216 in various ways. In the illustrated example, the power scheme 214 is depicted as being implemented via the power controller 112. In this example, the power scheme 214 is configured as firmware associated with the host computing device 102. For example, the power scheme 214 may represent firmware associated with a microcontroller 202, power controller 112, or other suitable hardware logic device. Alternatively, the power scheme 214 may be implemented as a standalone module using any suitable combination of hardware, software, firmware, and/or logic devices.

The power scheme 214 represents functionality to implement power management contract techniques described above and below as well as other power management functions. In particular, the power scheme 214 may be configured to jointly manage power flow between a power adapter 114, host computing device 102, and accessory device 104. By way of example and not limitation, this may include controlling power flow to selectively charge batteries associated with the components; exchange power between the batteries, processing systems, and components; supply power to service the system load for the host and accessory; and so forth. In order to do so, the power scheme 214 may provide functionality to establish, enforce, and update power management contracts 218 between various components of the system. This functionality may include support for sending and receiving messages regarding power management between system components that may be configured in a variety of ways. For example, the messages may be configured as pulsed signal patterns that are recognizable by respective controllers of the host and accessory. Various suitable messaging protocols and corresponding message formats are also contemplated, such as using inter-integrated circuit ($I^2C$) protocol, serial peripheral interface (SPI), universal asynchronous receiver/transmitter (UART) messaging, packet based communications, and object based messages, to name a few examples. Further, wireless messaging protocols such as near-field communication, Bluetooth, WiFi, RF protocols used in RFID, or cellular telecommunication protocols may be used.

The power management contracts 218 are configured to define operating constraints for power management including but not limited to specifying power exchange direction and current limits for different devices and scenarios. Moreover, the settings for power management contracts 218 may be modified in real-time based on conditions observed by the host or accessory. Thus, initial or default settings for a power management contracts 218 may be associated with different accessories and appropriate contracts may be activated upon initial connection and authorization of the different accessories. The initially activated power management contracts 218 may be modified thereafter based upon conditions including but not limited to relative states of charge (RSOC) for batteries of the system components, power loads being serviced, a number of peripherals 212 connected to the host and/or accessory, power source availability for system components, power supply characteristics, processing loads, and so forth. Thus, rather than fixing operating constraints for power exchange at the time accessories and/or peripherals are connected to the system, the power management contracts discussed herein are designed to enable dynamic adjustments to such constraints in response to changing conditions at any time during connection of an accessory to a host. Such modifications of initial settings for a power management contract 218 based on "real-time" conditions may be initiated by accessory devices and/or by the host computing device.

The security module 216 represents functionality operable to identify and/or authenticate accessory devices when the devices are attached/connected to the computing devices. The security module 216 may be configured to implement a variety of different authentication techniques.

Generally speaking, the security module 216 performs an authentication sequence in which credentials 220 (e.g., device ID/password, alphanumeric code, an identifying resistor value, etc.) associated with an accessory device 104 are obtained and verified. In one approach, the security module 216 is configured to provide functionality to support techniques for reversible connections of the connector 211 to the accessory port. For example, the security module 216 may represent functionality of the one or more microcontrollers 202 to detect insertion of the connector into the accessory port, sample detection pins of the connector 211 to ascertain an orientation of the connector as being straight or reversed according to values for the detection pins, and/or distinguish between different types of devices and/or communication protocols based on the sampling. Distinguishing between different types of devices may include distinguishing between two wire devices that utilize separate RX and TX lines and one wire devices for which RX/TX is combined on a single line or channel. Additionally, the security module 216 may represent functionality to set-up signal routing accordingly based on the ascertained orientation and/or the type of device.

Further, the accessory device 104 in FIG. 2 is illustrated as including example credentials 220, which may be provided to the security module 216 for authentication upon request. If the credentials are valid (e.g., the device is a recognized device that has associated privileges), the authentication is considered successful and the accessory device 104 may be authorized for power exchange through the power controller 112 and other interaction with the host computing device 102. Moreover, the credentials 220 may be associated with power management contract settings maintained for authorized device and therefore may be used to look-up and activate such settings (e.g., initial or default settings) for different devices upon successful authentication. On the other hand, if the credentials are not valid, interaction of the accessory device 104 with the computing device 102 may be restricted in various ways and/or prevented. Thus, the security module 216 may prevent unauthorized and/or unsupported devices from supplying/using power in ways that may be inefficient and/or unsafe.

Having considered the preceding discussion of an example operating environment, system, and devices, consider now a discussion of example devices, procedures, and scenarios which includes further details regarding techniques to implement reversible connectors for accessory devices.

Reversible Connector Details

Figure 3:
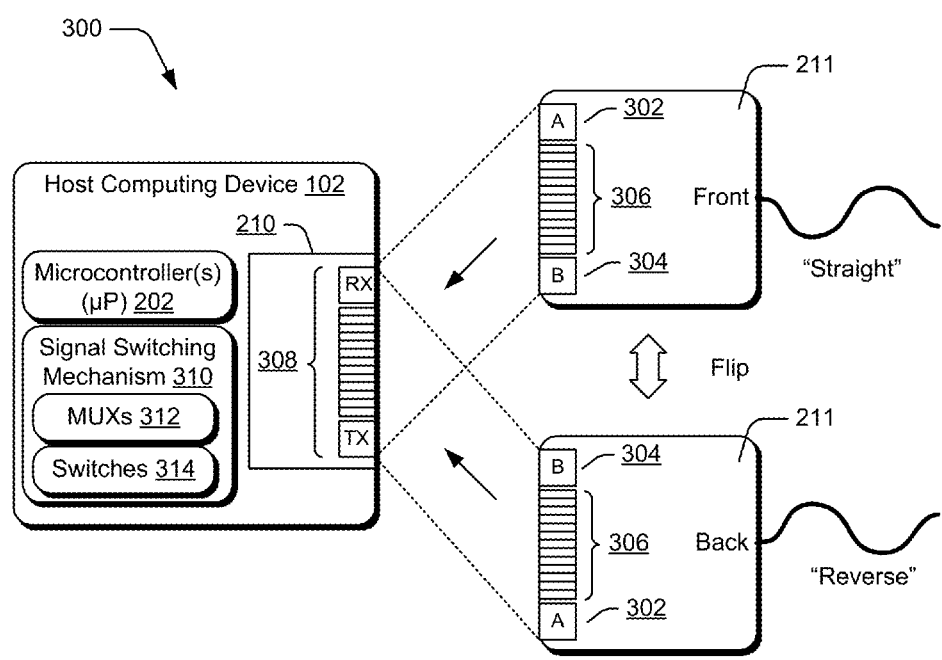
FIG. 3 depicts an example scenario for reversible connection of an accessory to an accessory port in accordance with one or more implementations.

FIG. 3 depicts generally a 300 an example scenario for reversible connection of a connector to an accessory port in accordance with one or more implementations. In this example, representative views of a connector 211 in both straight and reverse orientations is depicted. As mentioned, techniques for reversible connectors discussed herein may rely upon dedicated detection pins of the connector 211 and corresponding circuits/signals formed via the detection pins. In one approach, a pair of detection pins are employed for an interface 106 to support hot plug detection and communications for device authentication, power exchange, signal routing control, and so forth. The interface 106 is configurable based on the type of device and/or connector orientation to switch between different signal routing options (e.g., straight/reverse) and communication techniques (one wire/two wire).

Here, a detection pin pair including a pin A 302 (also referred to herein as "HPD1A") and a pin B 304 (also referred to herein as "HPD1B") is depicted. Although one pair of detection pins is shown, generally speaking two or more detection pins may be allocated for hot plug detection of accessories and be sampled to facilitate resolution of connector orientation and device type based on the signals conveyed/read via the detection pins. In the illustrated example, pin A 302 and pin B 304 are shown as being located generally on opposite edges and/or sides of a head of the connector 211. A variety of other pins 306 to support different communication protocols, buses, and high speed signals are also incorporated in the connector 211. By way of example, in addition to providing pins for authentication/power exchange/control, the connector 211 may provide pins to support USB, audio/video signals, a display port, network communications, and so forth. Generally, the pins are arranged as high speed pairs of pins. The pins 302, 304, 306 are configured to mate with a set of complimentary pins 308 included with an accessory port 210 of the host computing device.

In the illustrated arrangement pin A 302 and pin B 304 are configured to mate respectively with RX and TX pins associated with the accessory port 210 of the host computing device 102 in the "straight" orientation. In this arrangement, RX signals may be conveyed via pin A 302 and TX signals may be conveyed via pin B 304. When the connector is flipped or reversed to assume the "reverse" orientation also depicted in FIG. 3, pin B 304 now mates with the RX pin and pin A 302 now mates with the TX pin. In other words, these pin connections have physically changed positions. In the absence of correcting for the reversal, the RX/TX may end up crossed.

The host computing device, though, may include or otherwise make use of a switching mechanism 310 to "straighten-out" the signal routing. The switching mechanism provides functionality operable to control routing of signals such that the signals are communicated effectively between the same endpoints regardless of the connector orientation. The switching mechanism 310 is used to selectively change the signal pathways for the system to configure the accessory port and/or corresponding interface based on the connector orientation and/or for the particular type of device. Thus, for example, even when the connector is in the "reverse" orientation depicted in FIG. 3, the switching mechanism 310 may operate to change signal routing so that RX signals are still conveyed via pin A 302 and TX signals are conveyed via pin B 304. By way of example, the switching mechanism 310 may include one or more multiplexers 312 and/or switches 314 to enable control over the signal pathways. Although, the switching mechanism 310, multiplexers 312, and switches 314 are shown as components of the host device, multiplexers 312 and switches 314 employed to selectively reverse some signal pathways may be associated with an accessory device 104 in addition or alternatively to the switching mechanism 310, multiplexers 312, and switches 314 of the host. In this case, the host computing device 102 may operate to send commands to the accessory to cause set-up of signal routing via accessory signal switching components under the direction of the host.

Figure 4:
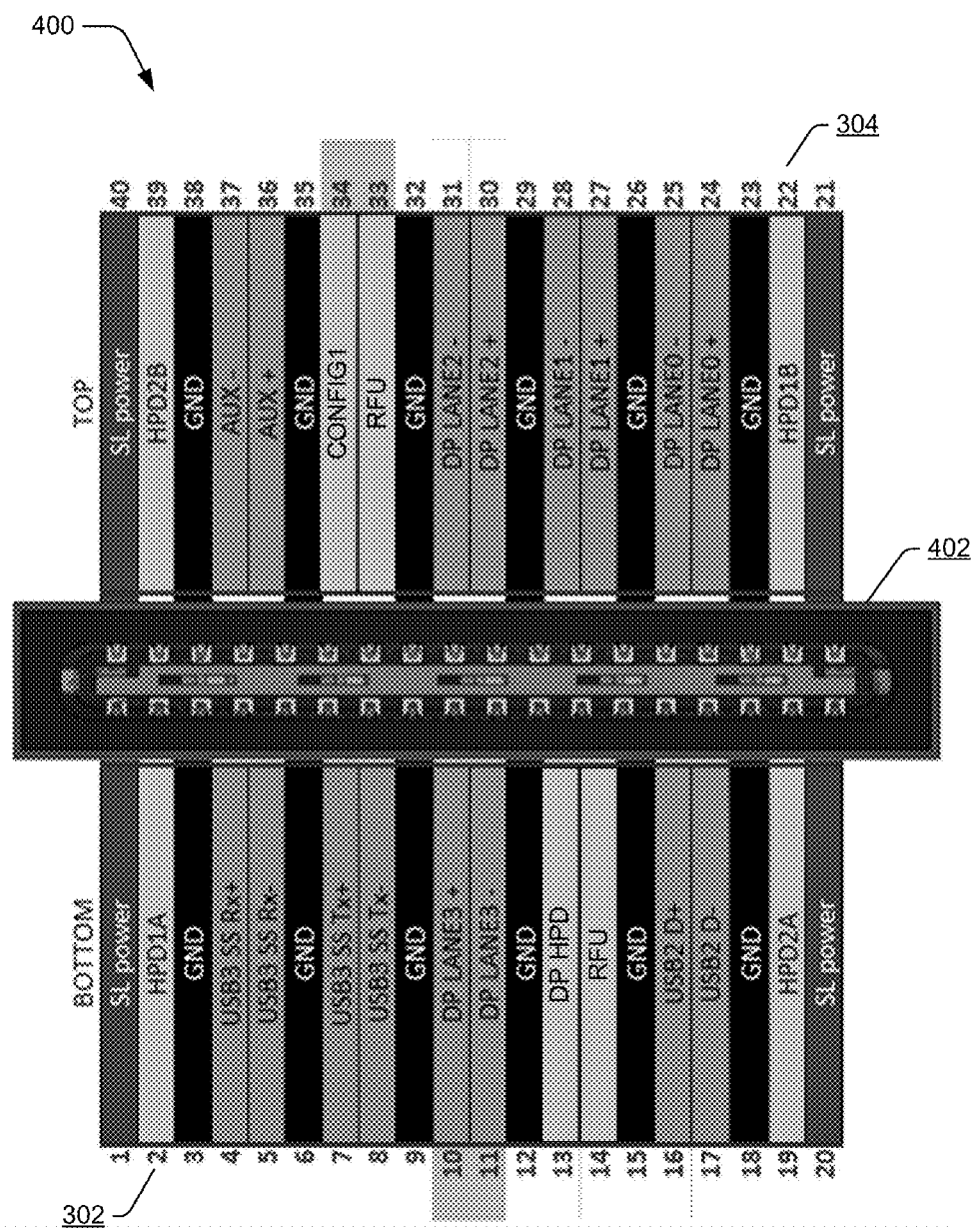
FIG. 4 depicts an example representation of an arrangement of pins for a connector in accordance with one or more implementations

FIG. 4 depicts generally at 400 a representative example showing details of but one example arrangement of pins for a connector head 402 of a connector 211. In this example, the connector includes forty pins. Pin A 302 and pin B 304 are shown as being on opposite ends of the connector head 402 and on opposite sides of the connector 211. Pin A 302 and Pin B 304 are labeled in the example as "HPD1A" and "HPD1B," respectively. The labels "HPD1A" and "HPD1B" are used interchangeably with the terms Pin A and Pin B in this document. Various other pins 306 for conveyance of different types of signals and data are also disposed within the connector head 402, including for example pins for USB3, USB2, power exchange, and so forth. The example pin arrangements shown and described in FIGS. 3 and 4 are meant as illustrative examples only and are not intended to limit the arrangements of pins and connector configurations that may be employed in accordance with the described techniques. Additional details regarding techniques associated with reversible connectors for accessory devices are discussed in relation to the following example procedures.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices and scenarios of FIGS. 2-4. Aspects of the procedures may be performed by a suitably configured computing device, such as the example host computing device 102 of FIG. 2 that includes or otherwise make use of one or more microcontrollers 202 to support reversible connectors 211. In addition or alternatively, aspects of the procedures may be performed via an accessory device, such as the example accessory device 104 of FIG. 2 that includes or otherwise make use of one or more microcontrollers 206.

Figure 5:
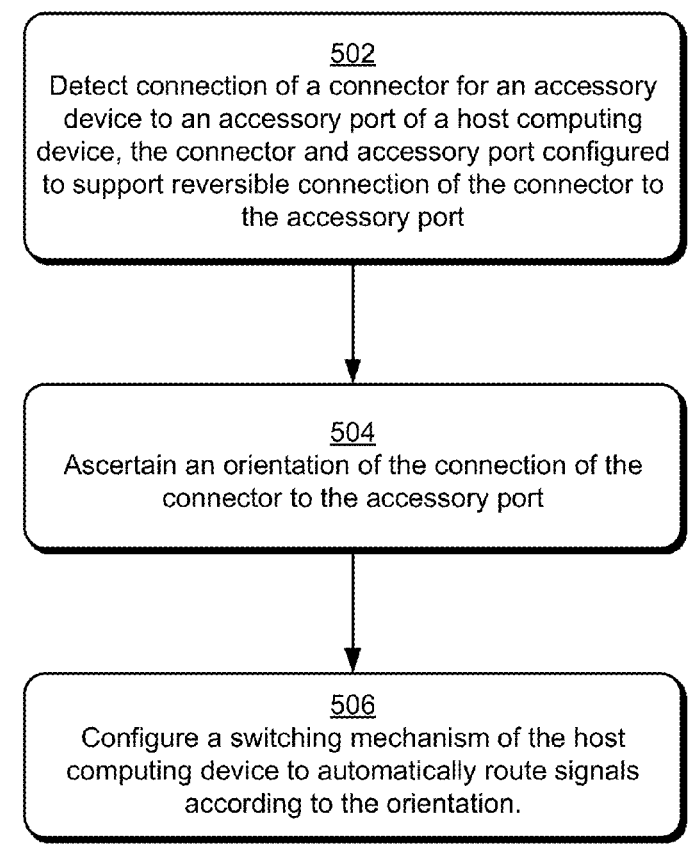
FIG. 5 depicts an example procedure in accordance with one or more implementations.

FIG. 5 depicts an example procedure 500 in which signal routing is set-up in accordance with orientation of reversible connector. Connection is detected of a connector for an accessory device to an accessory port of a host computing device, the connector and accessory port configured to support reversible connection of the connector to the accessory port (block 502). For example, one or more microcontrollers 202 associated with a host computing device 102 may be configured to recognize connection of various devices to an accessory port 210. The detection may occur in various ways. In one approach, the one or more microcontrollers 202 are able to detect signals sent by an accessory device when a connector 211 is successfully attached to the accessory interface 210. The signals may comprise logic states, a voltage input signal, a pulsed pattern, static resistor values, and so forth. Alternatively the host computing device 102 may be configured to poll the accessory port 210 to determine when devices are attached or detached thereto, such as by monitoring detection lines and reading resistor values corresponding to the accessory. Attachment may initiate further processing to determine identity and/or device type associated with an accessory as well as orientation of the connector. Then, signal routing lines and/or the communication interface(s) between the host and accessory may be configured to match the type of accessory and orientation of the connector.

In particular, after attachment of the accessory device, an orientation of the connection of the connector to the accessory port is ascertained (block 504). The orientation may be resolved in various ways. Generally the orientation is determined based upon signals sampled on detection pins described herein. The particular values and/or patterns that are conveyed upon connection of a connector are indicative of the type of device as well as the connector orientation. Then, a switching mechanism of the host computing device is configured to automatically route signals according to the orientation (block 506). For example, one or more microcontrollers 202 of a host computing device may operate to configure a switching mechanism 310 in the manner previously described to set signal pathways based on an ascertained orientation of a connector 211. This may involve positioning of multiplexers 312 and switches 314 associated with the switching mechanism 310. In addition or alternatively, microcontrollers 202 may communicate with microcontrollers 206 of an accessory device 104 to notify the accessory device regarding the connector orientation and/or direct the accessory device 104 to reconfigure a switching mechanism on the accessory side accordingly to set-up appropriate signal routing. In this manner, endpoints for signal pathways may remain the same regardless of connector orientation. Thus, consumers may plug in accessories to a host device via a reversible cable in either orientation (straight or reverse) and the system automatically figures out the orientation and ensures that the signals do not get mixed up.

In one or more implementations, dedicated detection pins may be employed for hot plug detection and resolution of orientation as described herein. The detection may be based upon a voltage (e.g., 5V) that is applied to the detection lines and corresponding logic states for the pins, e.g., high=1, or low=0, that are obtained/read in response to the applied voltage. Different possible combinations of logic states for the detection lines may be associated with a set of detection cases each of which corresponds to a type of device and/or an orientation of a connector 211. Lines associated with the detection pins may be sampled together (e.g., in parallel or in sequence) and values for obtained for the different lines may be combined together to derive a combined logic state that is indicative of the device type and/or connector orientation. Accordingly, a table, file, database or other data structure may be established that reflects mapping of logic state combinations (or other credentials/accessory identifiers) with corresponding detection cases. In operation, the one or more microcontrollers 202 may monitor the detection pins and obtain values on each detection line. The microcontrollers 202 may make use of a mapping of the possible logic state combinations with corresponding detection cases to resolve the device type and connector orientation.

Regarding device type, the logic state combinations provide a mechanism to enable the host to distinguish between different types of devices. In particular, a detected logic state combination indicates whether a device is a one wire device that may communicate via a single line with RX and TX combined or a two wire device that uses two different lines for RX and TX. One wire devices may be relatively simple and low cost devices that do not use complex communication schemes, such as a basic power adapter or external battery. Two wire devices may be devices that provide functionality involving advanced interfaces, high speed communications, and/or multiple types of data/protocols, such as a docking station, multi-media accessory, and so forth.

In the case of a pair of detection pins allocated for hot plug detection, such as HPD1A and HPD1B (e.g., Pin A 302 and Pin B 304), there are four possible logic state combinations, e.g., high-high, high-low, low-high, and low-low. The logic states are indicative of the type of device (e.g., one wire or two wire) and may also be used to directly or indirectly resolve the connector orientation. In particular, both of the pins HPD1A and HPD1B are not asserted (e.g., in a low state) in the absence of a connected accessory. When an accessory device is connected to the host, the particular combination of the states for HPD1A and HPD1B determines the accessory type. For one wire devices, the line on which a high state is asserted can be determined. Accordingly, the logic state combination for a one-wire device also reflects the connector orientation and may be used directly to ascertain the orientation. For two wire devices, both lines have high states and thus the logic state combination may be insufficient to resolve the orientation. Therefore, additional processing may be performed as described below to ascertain the orientation of a two wire device.

Thus, for the detection pins HPD1A and HPD1B, the following shows an illustrative table showing an example mapping of possible logic state combinations to detection cases:

TABLE 1

Detection Pin Logic State Mapping

|  | HPD1A<br>High = 1 | HPD1A<br>Low = 0 |
|---|---|---|
| HPD1B<br>High = 1 | Two wire accessory | One wire accessory (reverse) |
| HPD1B<br>Low = 0 | One wire accessory (straight) | No accessory attached |

Per the above table, the values 1, 1 (high-high) indicates a two wire accessory, 1, 0 (high-low) indicates a one wire accessory in a straight orientation, 0, 1 (low-high) indicates a one wire accessory in a reverse orientation, and 0, 0 (low-low) indicates that no accessory is attached. After determining the device type using a mapping such as the example of Table 1, additional processing may occur to perform authentication/authorization of device, determine a particular identity and/or capabilities of the device (as opposed to just the one wire vs two wire determination), and set-up switching mechanisms of the host and/or accessory to route signals appropriately.

For example, for a one wire device, sampling may occur via the asserted pin (either HPD1A or HPD1B) to identify and authorize the device. This may involve various different authentication techniques as described previously. The authentication enables the host/microcontroller to recognize unsupported accessories and determine specific configuration information for supported accessories based on the particular accessory identity to configure the interface and signal routing accordingly. For instance, accessory devices may be configured to supply credentials 220 to the host in various ways as mentioned previously. In one approach, accessory devices are configured to expose a respective resistor value indicative of the identity for reading by the host computing device. Different resistor values may be associated with different accessories. Thus, when an accessory is connected, the host computing device may read a corresponding resistor value and distinguish between different accessories on this basis. Alternatively, other credentials 220 may be communicated to the host by an accessory to indicate its identity, such as sending a particular numeric code, an ID field value, a device name, and so forth.

As noted, when the attached accessory is a two wire device, the logic state combination is not sufficient to enable an orientation determination. In this case, orientation is resolved through the authentication sequence. In order to do so, supported two wire devices may be configured to supply credentials 220 to the host via either or both of the signal lines. In this case, sampling occurs for both of HPD1A or HPD1B to identify and authorize the two wire device. In one approach, the two wire device may have ID resistors associated with one or both lines and may expose the resistor value(s) indicative of the identity. Again, other credentials 220 may also be communicated to the host by an accessory to indicate its identity. Orientation may then be determined based on mapping of ID validity states for each line, e.g., valid or invalid, to possible orientation cases. Thus, for the detection pins HPD1A and HPD1B, the following shows an illustrative table showing an example mapping of ID validity states orientation cases:

TABLE 2

Two-Wire Detection Pin ID Validity State Mapping

|  | HPD1A:<br>valid ID | HPD1A:<br>invalid ID |
|---|---|---|
| HPD1B:<br>valid ID | Both orientations supported. Configure based on application | 2-wire accessory (reverse) |
| HPD1B:<br>invalid ID | 2-wire accessory (straight) | unsupported accessory |

Figure 6:
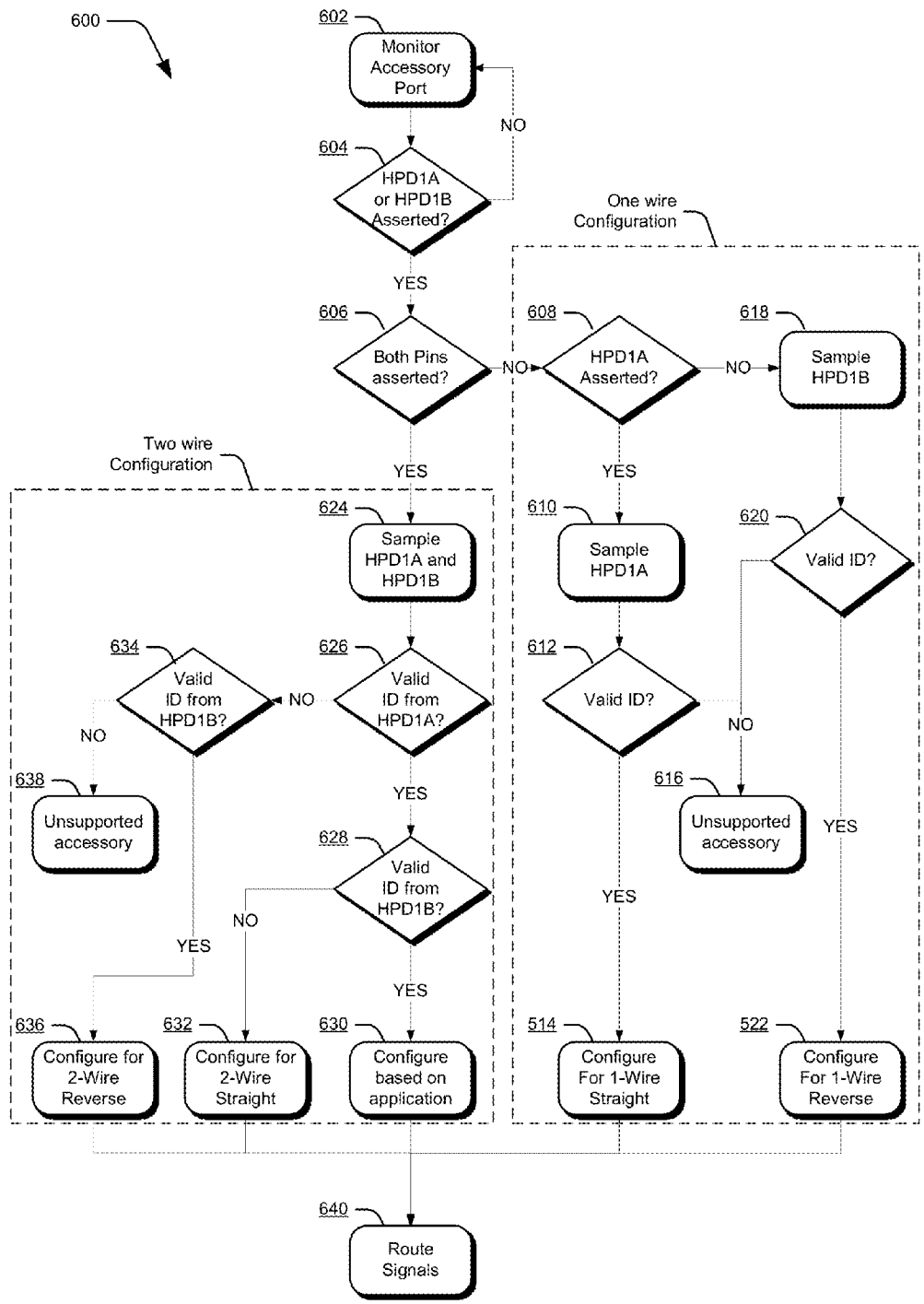
FIG. 6 depicts another example procedure in accordance with one or more implementations.

FIG. 6 depicts an example procedure 600 that illustrates example logic for processing that may occur to detect both device type and orientation in accordance with one or more implementations. In particular, the procedure 600 represents but one example technique that may be employed to resolve device type and connector orientation upon connection of an accessory to a host. The procedure 600 additionally represents one possible implementation of the mappings for detection pins HPD1A and HPD1B reflected in Table 1 and Table 2 described just above.

An accessory port is monitored (block 602) to detect connection of an accessory via a corresponding connector cord. The monitoring may be implemented by a microcontroller 202 and/or security module 216 as described herein. The accessory port 210 and connector 211 may be configured to have a pair of pins allocated for detection, e.g., detection pins HPD1A and HPD1B. A determination is made regarding whether either of pins HPD1A and HPD1B is asserted (e.g., signal value of high=1) (block 604). If not, monitoring of the port continues per block 602. If at least one of the pins is asserted, a check is made to determine if both pins are asserted (block 606). If both pins are not asserted, procedure 600 proceeds to operations associated with one wire configuration and otherwise both pins are asserted and procedure 600 proceeds to operations associated with two wire configuration.

For one wire configuration, determination is made regarding whether HPD1A is asserted (block 608) and if so, HPD1A is sampled (block 610) to obtain credentials for identification. Based on the credentials, an ID of the connected accessory is validated (block 612) and when the ID is valid, the system is configured for one wire in straight orientation (block 614). On the other hand, if the ID is not valid the accessory is an unsupported accessory (block 616) and interaction may be restricted. If HPD1A is not asserted per block 608, the other pin HPD1B is the asserted pin and is sampled (block 618). ID validation again occurs (block 620) and either, the ID is valid and the system is configured for one wire in reverse orientation (block 622) or the ID is not valid the accessory is an unsupported accessory (block 616) and may be restricted.

For two wire configuration, both HPD1A and HPD1B are sampled (block 624). ID validation occurs for HPD1A (block 626) and then for HPD1B (block 628) if the ID sampled on HPD1A is valid. If IDs for both HPD1A and HPD1B are valid, then both straight and reverse orientations are supported and configuration occurs based on the application (block 630). Otherwise, if just the ID for HPD1A is valid, then the system is configured for two wire in straight orientation (block 632). If HPD1A is not valid per block 626, ID validation occurs for HPD1B (block 634). If HPD1B is valid per block 634, then system is configured for two wire in reverse orientation (block 636). Otherwise, IDs sampled for both HPD1A and HPD1B are invalid and the accessory is an unsupported accessory (block 638) and may be restricted. Following configuration of the system in the appropriate way based on the depicted logic, signals are the routed using the configuration that us applied (block 640).

Example procedure 600 may be implemented in software, firmware, hardware, or a combination of each or some of same. A software or firmware implementation may be advantageously flexible and reconfigured with a software or firmware update. Alternatively, example procedure 600 may be implemented using discrete logic gates and analog and mixed-signal circuits, including analog-to-digital circuits. This alternative may be advantageously faster and may also comprise programmable thresholds, for example, for determining resistor values. Because of the binary nature of the decisions, digital logic may be used extensively.

Having considered the foregoing example procedures, consider now a discussion of example systems and devices that may be employed to implement aspects of reversible connector techniques in one or more embodiments.

Example System and Device

Figure 7:
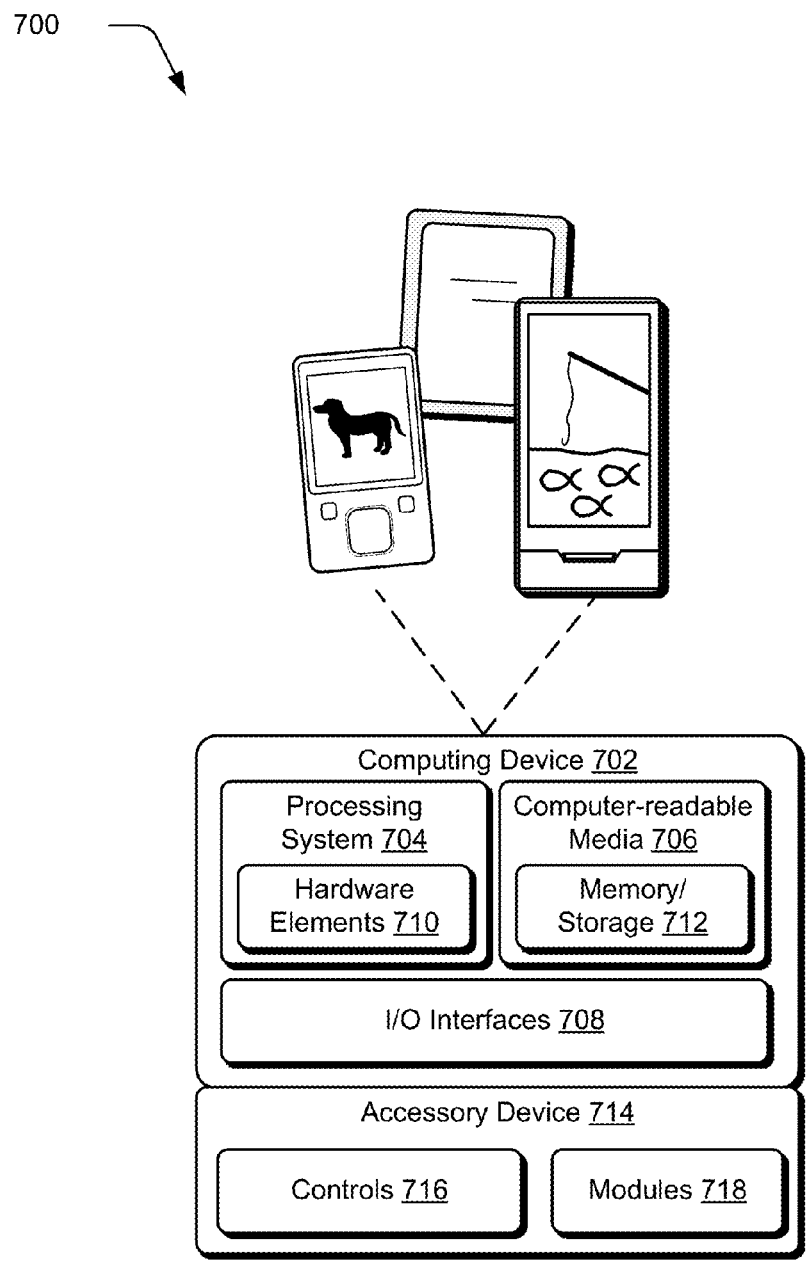
FIG. 7 illustrates an example system including various components of an example device that can be implemented as any type of computing device to implement embodiments of the techniques described herein.

FIG. 7 illustrates an example system generally at 700 that includes an example computing device 702 that is representative of one or more computing systems and/or devices that may implement the various techniques described herein. The computing device 702 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways to support user interaction.

The computing device 702 is further illustrated as being communicatively and physically coupled to an accessory device 714 that is physically and communicatively removable from the computing device 702. In this way, a variety of different input devices may be coupled to the computing device 702 having a wide variety of configurations to support a wide variety of functionality. In this example, the accessory device 714 includes one or more controls 716, which may be configured as press-sensitive keys, mechanically switched keys, buttons, and so forth.

The accessory device 714 is further illustrated as include one or more modules 718 that may be configured to support a variety of functionality. The one or more modules 718, for instance, may be configured to process analog and/or digital signals received from the controls 716 to determine whether an input was intended, determine whether an input is indicative of resting pressure, support authentication of the accessory device 714 for operation with the computing device 702, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
    detecting insertion of a connector into an accessory port of a computing device based on detection pin signals conveyed via a plurality of detection pins in the connector;
    ascertaining an orientation of the connector inserted in the accessory port based on the detection pin signals;
    determining, based on logic states of the detection pin signals, whether an accessory device connected via the connector is a one-wire type device or a two-wire type device; and
    configuring a switching mechanism of the computing device to route signals to pins of the accessory port according to the ascertained orientation and the determined type of the accessory device connected.

2. The method of claim 1, wherein detecting insertion of the connector further comprises sampling the signals conveyed via the detection pins and combining values of the sampled signals to determine the logic states of the detection pin signals.

3. The method of claim 2, wherein sampling the signals conveyed via the detection pins is performed in parallel.

4. The method of claim 1, wherein the detection pins provide an interface that supports hot plug detection and communications for device authentication, power exchange, or signal routing control.

5. The method of claim 1, wherein configuring the switching mechanism comprises directing switches or multiplexers of the computing device to route signal path connections to pins of the accessory port.

6. The method of claim 5, wherein configuring the switching mechanism further comprises sending commands from the computing device to the accessory device connected via the connector inserted in the accessory port, that cause the accessory device to configure signal routing within the accessory device via signal switching components of the accessory device.

7. The method of claim 1, wherein
    ascertaining the orientation of the connector inserted in the accessory port when the accessory device is a two-wire type device further comprises:
    resolving the orientation via an authentication sequence in which credentials presented by the accessory device are used by the computing device to establish validity states for the detection pins indicative of the orientation.

8. The method of claim 7, wherein the credentials presented by the accessory device comprise one or more resistor values exposed on the detection pin signals conveyed by the detection pins.

9. A device comprising:
    one or more processors;
    one or more computer-readable storage media;
    an accessory port configured to receive a connector for an accessory device; and instructions stored on computer-readable storage media that when executed by the one or more processors cause the device to perform operations including:
detecting insertion of the connector into the accessory port based on detection pin signals conveyed via a plurality of detection pins of the connector;
obtaining a logic state of the detection pin signals;
determining a type of the accessory device based upon the obtained logic state of the detection pin signals;
ascertaining an orientation of the connector inserted in the accessory port by:
when the accessory device is a one-wire type device, determining the orientation of the connector directly from the logic states of the detection pin signals; or
when the accessory device is a two-wire type device, measuring values of identity resistors exposed by the accessory device via the detection pin signals, and
determining the orientation of the connector based on predetermined valid values of the measured values of the identity resistors; and
configuring signal routing to pins of the accessory port according to the determined type of the accessory device and the ascertained orientation.

10. The device of claim 9, wherein a one-wire type device is a device that communicates via receive and transmit signals conveyed over a single line.

11. The device of claim 9, wherein a two-wire type device is a device that communicates via receive and transmit signals conveyed over separate lines.

12. The device of claim 9, wherein configuring signal routing according to the determined type of the accessory device and the ascertained orientation includes sending commands to a switching mechanism that cause it to route signal path connections to pins of the accessory port.

13. The device of claim 9, wherein determining the type of the accessory device based upon the logic state of the detection pin signals comprises using a data structure mapping of possible logic state combinations to accessory device types.

14. The device of claim 9, wherein the instructions that when executed further cause the device to determine whether credentials supplied by the accessory device indicate if it is an accessory device authorized for interacting with the device, or if it is an unsupported accessory device.

15. The device of claim 9, wherein the instructions are implemented via firmware communicatively coupled to the one or more processors of the device, and wherein the one or more processors are configured to operate independently of a primary processing system of the device.

16. A device comprising:
a processing system;
one or more computer-readable storage media; and
instructions stored on computer-readable storage media that when executed by the processing system cause the device to perform security actions that:
detect insertion of a connector for an accessory device into an accessory port of the device based on logic states of detection pin signals conveyed from the accessory device via detection pins of the connector,
the connector and accessory port configured to support reversible insertion of the connector into the accessory port;
identify an accessory device type according to the logic states of the detection pin signals, the logic states indicating whether the accessory device is a one-wire type device or a two-wire type device;
ascertain an orientation of the connector inserted into the accessory port; and
configure a switching mechanism of the device to route signals to the detection pins of the accessory port according to the identified accessory device type and the ascertained orientation of the connector.

17. The device of claim 16, wherein the detection pins provide an interface that supports hot plug detection and communications for device authentication, power exchange, or signal routing control.

18. The device of claim 16, wherein the switching mechanism is configured by setting positions of switches or multiplexers of the device to route signal paths straight or reversed to pins of the accessory port according to the ascertained orientation of the connector; or
by sending commands from the device to the accessory device that cause it to configure signal routing at the accessory device via signal switching components of the accessory device.

19. The device of claim 16, wherein the logic states include high and low logic states conveyed via the detection pin signals.

20. The device of claim 16, wherein the orientation of the connector inserted into the accessory port is ascertained based on:
a determination of the orientation directly from the logic states of the detection pin signals when the accessory device is a one-wire type device; or
an authentication sequence in which credentials presented by the accessory device are used to establish validity states for the detection pin signals indicative of the orientation when the accessory device is a two-wire type device.

* * * * *